US012643206B2

(12) United States Patent
Dey, IV et al.

(10) Patent No.: US 12,643,206 B2
(45) Date of Patent: Jun. 2, 2026

(54) SYSTEM AND METHOD FOR CONFIGURING A POWER TOOL WITH AN IMPACT MECHANISM

(71) Applicant: MILWAUKEE ELECTRIC TOOL CORPORATION, Brookfield, WI (US)

(72) Inventors: John S. Dey, IV, New York, NY (US); Jeffrey M. Wackwitz, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/029,148

(22) Filed: Jan. 17, 2025

(65) Prior Publication Data

US 2025/0229392 A1 Jul. 17, 2025

Related U.S. Application Data

(63) Continuation of application No. 18/344,315, filed on Jun. 29, 2023, now Pat. No. 12,226,881, which is a (Continued)

(51) Int. Cl.
*B25B 23/00* (2006.01)
*B25B 21/02* (2006.01)
*B25B 23/147* (2006.01)

(52) U.S. Cl.
CPC .......... *B25B 23/1475* (2013.01); *B25B 21/02* (2013.01)

(58) Field of Classification Search
CPC ............................ B25B 21/02; B25B 23/1475
See application file for complete search history.

(56) References Cited

U.S. PATENT DOCUMENTS 3,882,305 A 5/1975 Johnstone
4,680,862 A 7/1987 Wieland et al.
(Continued)

FOREIGN PATENT DOCUMENTS

DE 10309703 A1 9/2004
EP 2147750 A1 1/2010
(Continued)

OTHER PUBLICATIONS

Chinese Patent Office Action for Application No. 201611167369.7 dated Jul. 4, 2019 (16 pages, statement of relevance included).
(Continued)

*Primary Examiner* — Eyamindae C Jallow
(74) *Attorney, Agent, or Firm* — Michael Best & Friedrich LLP

(57) ABSTRACT

A power tool with an impact mechanism and that is controlled based on a drive angle from impacting. The power tool includes a housing, a brushless direct current (DC) motor within the housing, an impact mechanism, and an output drive device. The brushless DC motor includes a rotor coupled to a motor shaft to produce a rotational output. The impact mechanism includes a hammer coupled to the motor shaft, and an anvil that receives impacts from the hammer and drives an output device. The power tool further includes a position sensor that senses a position of the rotor and a controller coupled to the position sensor. The controller detects an impact of the impact mechanism, calculates a drive angle of the anvil caused by the impact based on output from the position sensor, and controls the brushless DC motor based on the drive angle.

20 Claims, 14 Drawing Sheets

Related U.S. Application Data continuation of application No. 16/842,412, filed on Apr. 7, 2020, now Pat. No. 11,691,256, which is a continuation of application No. 15/381,217, filed on Dec. 16, 2016, now Pat. No. 10,646,982.

(60) Provisional application No. 62/268,708, filed on Dec. 17, 2015.

(56) References Cited

U.S. PATENT DOCUMENTS

| | | | |
|---|---|---|---|
| 4,685,050 | A | 8/1987 | Polzer et al. |
| 4,854,786 | A | 8/1989 | Alexander et al. |
| 5,277,261 | A | 1/1994 | Sakoh |
| 5,315,501 | A | 5/1994 | Whitehouse |
| 5,592,396 | A | 1/1997 | Tambini et al. |
| 5,903,462 | A | 5/1999 | Wagner et al. |
| 5,942,975 | A | 8/1999 | Sørensen |
| 6,055,484 | A | 4/2000 | Lysaght |
| 6,123,241 | A | 9/2000 | Walter et al. |
| 6,161,629 | A | 12/2000 | Hohmann et al. |
| 6,279,668 | B1 | 8/2001 | Mercer |
| 6,349,266 | B1 | 2/2002 | Lysaght et al. |
| 6,405,598 | B1 | 6/2002 | Bareggi |
| 6,424,799 | B1 | 7/2002 | Gilmore |
| 6,431,425 | B1 | 8/2002 | Moorman et al. |
| 6,469,615 | B1 | 10/2002 | Kady et al. |
| 6,508,313 | B1 | 1/2003 | Carney et al. |
| 6,520,270 | B2 | 2/2003 | Wissmach et al. |
| 6,522,949 | B1 | 2/2003 | Ikeda et al. |
| 6,547,014 | B2 | 4/2003 | McCallops et al. |
| 6,598,684 | B2 | 7/2003 | Watanabe |
| 6,668,212 | B2 | 12/2003 | Colangelo, II et al. |
| 6,687,567 | B2 | 2/2004 | Watanabe |
| 6,836,614 | B2 | 12/2004 | Gilmore |
| 6,848,516 | B2 | 2/2005 | Giardino |
| 6,954,048 | B2 | 10/2005 | Cho |
| 6,968,908 | B2 | 11/2005 | Tokunaga et al. |
| 6,981,311 | B2 | 1/2006 | Seith et al. |
| 7,036,703 | B2 | 5/2006 | Grazioli et al. |
| 7,062,998 | B2 | 6/2006 | Hohmann et al. |
| 7,086,483 | B2 | 8/2006 | Arimura et al. |
| 7,102,303 | B2 | 9/2006 | Brotto et al. |
| 7,112,934 | B2 | 9/2006 | Gilmore |
| 7,137,541 | B2 | 11/2006 | Baskar et al. |
| 7,211,972 | B2 | 5/2007 | Garcia et al. |
| 7,243,440 | B2 | 7/2007 | DeKeyser |
| 7,330,129 | B2 | 2/2008 | Crowell et al. |
| 7,343,764 | B2 | 3/2008 | Solfronk |
| 7,346,422 | B2 | 3/2008 | Tsuchiya et al. |
| 7,359,762 | B2 | 4/2008 | Etter et al. |
| 7,382,272 | B2 | 6/2008 | Feight |
| 7,437,204 | B2 | 10/2008 | Lev-Ami et al. |
| 7,464,769 | B2 | 12/2008 | Nakazawa et al. |
| 7,501,778 | B2 | 3/2009 | Hashimoto et al. |
| 7,540,334 | B2 | 6/2009 | Gass et al. |
| 7,613,590 | B2 | 11/2009 | Brown |
| 7,646,155 | B2 | 1/2010 | Woods et al. |
| RE41,185 | E | 3/2010 | Gilmore et al. |
| 7,784,104 | B2 | 8/2010 | Innami et al. |
| 7,787,981 | B2 | 8/2010 | Austin et al. |
| 7,795,829 | B2 | 9/2010 | Seiler et al. |
| 7,809,495 | B2 | 10/2010 | Leufen |
| 7,817,062 | B1 | 10/2010 | Li et al. |
| 7,834,566 | B2 | 11/2010 | Woods et al. |
| 7,868,591 | B2 | 1/2011 | Phillips et al. |
| 7,900,524 | B2 | 3/2011 | Calloway et al. |
| 7,911,379 | B2 | 3/2011 | Cameron |
| 7,928,673 | B2 | 4/2011 | Woods et al. |
| 7,931,096 | B2 | 4/2011 | Saha |
| 7,942,084 | B2 | 5/2011 | Wilson, Jr. et al. |
| 7,942,211 | B2 | 5/2011 | Scrimshaw et al. |
| 7,982,624 | B2 | 7/2011 | Richter et al. |
| 8,004,664 | B2 | 8/2011 | Etter et al. |
| 8,044,796 | B1 | 10/2011 | Carr, Sr. |
| 8,049,636 | B2 | 11/2011 | Buckingham et al. |
| 8,171,828 | B2 | 5/2012 | Duvan et al. |
| 8,210,275 | B2 | 7/2012 | Suzuki et al. |
| 8,264,374 | B2 | 9/2012 | Obatake et al. |
| 8,286,723 | B2 | 10/2012 | Puzio et al. |
| 8,294,424 | B2 | 10/2012 | Bucur |
| 8,310,206 | B2 | 11/2012 | Bucur |
| 8,316,958 | B2 | 11/2012 | Schell et al. |
| 8,330,426 | B2 | 12/2012 | Suzuki et al. |
| 8,438,955 | B2 | 5/2013 | Wilson, Jr. et al. |
| 8,464,808 | B2 | 6/2013 | Leü |
| 8,485,049 | B2 | 7/2013 | Yokoyama et al. |
| 8,657,482 | B2 | 2/2014 | Malackowski et al. |
| 8,678,106 | B2 | 3/2014 | Matsunaga et al. |
| 8,823,322 | B2 | 9/2014 | Noda et al. |
| 8,890,449 | B2 | 11/2014 | Suzuki et al. |
| 8,919,456 | B2 | 12/2014 | Ng et al. |
| 9,030,145 | B2 | 5/2015 | Brennenstuhl et al. |
| 9,031,585 | B2 | 5/2015 | Kahle et al. |
| 9,038,743 | B2 | 5/2015 | Aoki |
| 9,061,392 | B2 | 6/2015 | Forgues et al. |
| 9,073,134 | B2 | 7/2015 | Koeder et al. |
| 9,126,317 | B2 | 9/2015 | Lawton et al. |
| 9,144,875 | B2 | 9/2015 | Schlesak et al. |
| 9,216,505 | B2 | 12/2015 | Rejman et al. |
| 9,232,614 | B2 | 1/2016 | Hiroi |
| 9,233,457 | B2 | 1/2016 | Wanek et al. |
| 9,242,356 | B2 | 1/2016 | King et al. |
| 9,257,865 | B2 | 2/2016 | Hiuggins et al. |
| 9,281,770 | B2 | 3/2016 | Wood et al. |
| 10,919,134 | B2 | 2/2021 | Miyazaki et al. |
| 2001/0052416 | A1 | 12/2001 | Wissmach et al. |
| 2002/0033267 | A1 | 3/2002 | Schweizer et al. |
| 2003/0121677 | A1 | 7/2003 | Watanabe et al. |
| 2004/0182587 | A1 | 9/2004 | May et al. |
| 2005/0035659 | A1 | 2/2005 | Hahn et al. |
| 2005/0045353 | A1 | 3/2005 | Kawai et al. |
| 2005/0263305 | A1 | 12/2005 | Shimizu et al. |
| 2006/0009879 | A1 | 1/2006 | Lynch et al. |
| 2006/0076385 | A1 | 4/2006 | Etter et al. |
| 2006/0185869 | A1 | 8/2006 | Arimura |
| 2009/0084568 | A1 | 4/2009 | Arimura et al. |
| 2009/0250364 | A1 | 10/2009 | Gerold et al. |
| 2009/0251330 | A1 | 10/2009 | Gerold et al. |
| 2010/0116519 | A1 | 5/2010 | Gareis |
| 2010/0154599 | A1 | 6/2010 | Gareis |
| 2010/0176766 | A1 | 7/2010 | Brandner et al. |
| 2010/0216415 | A1* | 8/2010 | Arimura ................ G08C 17/02 455/90.1 |
| 2011/0067895 | A1 | 3/2011 | Nobe et al. |
| 2011/0079407 | A1 | 4/2011 | Limura et al. |
| 2011/0162858 | A1 | 7/2011 | Coste |
| 2012/0167721 | A1 | 7/2012 | Fluhrer |
| 2012/0168189 | A1 | 7/2012 | Eckert |
| 2012/0199372 | A1 | 8/2012 | Nishikawa et al. |
| 2012/0222876 | A1 | 9/2012 | Schmidt et al. |
| 2012/0292070 | A1 | 11/2012 | Ito et al. |
| 2013/0024245 | A1 | 1/2013 | Nichols et al. |
| 2013/0062086 | A1 | 3/2013 | Ito et al. |
| 2013/0071815 | A1 | 3/2013 | Hudson et al. |
| 2013/0087355 | A1 | 4/2013 | Oomori et al. |
| 2013/0118767 | A1 | 5/2013 | Cannaliato et al. |
| 2013/0126202 | A1 | 5/2013 | Oomori et al. |
| 2013/0133907 | A1 | 5/2013 | Chen et al. |
| 2013/0133911 | A1 | 5/2013 | Ishikawa et al. |
| 2013/0153250 | A1 | 6/2013 | Eckert |
| 2013/0153252 | A1 | 6/2013 | Sakakibara |
| 2013/0187587 | A1 | 7/2013 | Knight et al. |
| 2013/0188058 | A1 | 7/2013 | Nguyen et al. |
| 2013/0193891 | A1 | 8/2013 | Wood et al. |
| 2013/0255980 | A1 | 10/2013 | Linehan et al. |
| 2013/0327552 | A1 | 12/2013 | Lovelass et al. |
| 2013/0333910 | A1 | 12/2013 | Tanimoto et al. |
| 2014/0006295 | A1 | 1/2014 | Zeiler et al. |
| 2014/0015389 | A1 | 1/2014 | Vatterott et al. |
| 2014/0069672 | A1 | 3/2014 | Mashiko et al. |
| 2014/0166324 | A1 | 6/2014 | Puzio et al. |
| 2014/0184397 | A1 | 7/2014 | Volpert |
| 2014/0262390 | A1 | 9/2014 | Arimura et al. |

(56) References Cited

U.S. PATENT DOCUMENTS

| | | | |
|---|---|---|---|
| 2014/0284070 | A1 | 9/2014 | Ng et al. |
| 2014/0331830 | A1 | 11/2014 | King et al. |
| 2014/0334270 | A1 | 11/2014 | Kusakawa |
| 2014/0336810 | A1 | 11/2014 | Li et al. |
| 2014/0336955 | A1 | 11/2014 | Li et al. |
| 2014/0350716 | A1 | 11/2014 | Fly et al. |
| 2014/0365259 | A1 | 12/2014 | Delplace et al. |
| 2014/0367134 | A1 * | 12/2014 | Phillips .................. B23B 45/02 173/176 |
| 2015/0000944 | A1 | 1/2015 | Dusselberg et al. |
| 2015/0002089 | A1 | 1/2015 | Rejman et al. |
| 2015/0042247 | A1 | 2/2015 | Kusakawa |
| 2015/0122524 | A1 | 5/2015 | Papp |
| 2015/0135306 | A1 | 5/2015 | Winkler et al. |
| 2015/0135907 | A1 | 5/2015 | Hirabayashi et al. |
| 2015/0137721 | A1 | 5/2015 | Yamamoto et al. |
| 2015/0158157 | A1 | 6/2015 | Hirabayashi et al. |
| 2015/0158170 | A1 | 6/2015 | Nitsche et al. |
| 2015/0171654 | A1 | 6/2015 | Horie et al. |
| 2015/0231770 | A1 | 8/2015 | Kusakawa et al. |
| 2015/0340921 | A1 | 11/2015 | Suda et al. |
| 2017/0008159 | A1 | 1/2017 | Boeck et al. |
| 2017/0232589 | A1 | 8/2017 | Gaul |
| 2017/0232597 | A1 | 8/2017 | Gaul |

FOREIGN PATENT DOCUMENTS

| | | | | |
|---|---|---|---|---|
| JP | 2000176850 | A | 6/2000 | |
| JP | 2004072563 | A | 3/2004 | |
| JP | 2006123080 | A | 5/2006 | |
| WO | WO0230624 | A2 | 4/2002 | |
| WO | WO2007090258 | A1 | 8/2007 | |
| WO | WO2011013854 | A1 | 2/2011 | |
| WO | WO2011102559 | A1 | 8/2011 | |
| WO | WO-2012160799 | A2 * | 11/2012 | ......... B25B 23/1475 |
| WO | WO2013116303 | A1 | 8/2013 | |
| WO | WO2013168355 | A1 | 11/2013 | |
| WO | WO-2015061370 | A1 * | 4/2015 | ............. B25B 21/02 |

OTHER PUBLICATIONS

European Search Report for Application No. 16204739.3 dated Jul. 12, 2017 (8 pages).

Chinese Patent Office Action for Application No. 201611167369.7 dated Oct. 18, 2018 (18 pages).

* cited by examiner

SYSTEM AND METHOD FOR CONFIGURING A POWER TOOL WITH AN IMPACT MECHANISM

RELATED APPLICATIONS

This application is a continuation of U.S. patent application Ser. No. 18/344,315, filed Jun. 29, 2023, which is a continuation of U.S. patent application Ser. No. 16/842,412, filed Apr. 7, 2020, now U.S. Pat. No. 11,691,256, which is a continuation of U.S. patent application Ser. No. 15/381,217, filed Dec. 16, 2016, now U.S. Pat. No. 10,646,982, which claims priority to U.S. Provisional Patent Application No. 62/268,708, filed on Dec. 17, 2015, the entire contents of each of which are hereby incorporated by reference.

FIELD OF THE INVENTION

The present invention relates to power tools that communicate with an external device and techniques for controlling power tools with impact mechanisms.

SUMMARY

In one embodiment, a power tool is provided that includes a housing, a brushless direct current (DC) motor within the housing, an impact mechanism, and an output drive device. The brushless DC motor includes a rotor and a stator, wherein the rotor is coupled to a motor shaft to produce a rotational output. The impact mechanism includes a hammer coupled to the motor shaft, and an anvil that receives impacts from the hammer. The output drive device is coupled to the anvil and rotates to perform a task. The power tool further includes a position sensor that senses a position of the rotor and a controller coupled to the position sensor. The controller detects an impact of the impact mechanism, calculates a drive angle of the anvil caused by the impact based on output from the position sensor, and controls the brushless DC motor based on the drive angle.

In one embodiment, a method of controlling a power tool is provided. The method includes driving a brushless direct current (DC) motor. The brushless DC motor includes a stator and a rotor, and the rotor is coupled to a motor shaft to produce a rotational output. The method further includes impacting an anvil of an impact mechanism, by a hammer of the impact mechanism that is coupled to the motor shaft, to rotate an output drive device coupled to the anvil. The method further includes sensing a position of the rotor by a position sensor and detecting, by a controller, an impact of the impact mechanism. The controller calculates a drive angle of the anvil caused by the impact based on output from the position sensor and controls the brushless DC motor based on the drive angle.

In one embodiment, a power tool is provided that includes a housing, a brushless direct current (DC) motor within the housing, an impact mechanism, and an output drive device. The brushless DC motor includes a rotor and a stator, wherein the rotor is coupled to a motor shaft to produce a rotational output. The impact mechanism includes a hammer coupled to the motor shaft, and an anvil that receives impacts from the hammer. The output drive device is coupled to the anvil and rotates to perform a task. The power tool further includes a position sensor that senses a position of the rotor and a controller coupled to the position sensor. The controller detects an impact of the impact mechanism and calculates a drive angle of the anvil caused by the impact based on output from the position sensor. The controller further controls the brushless DC motor based on the drive angle determines whether the drive angle is less than a drive angle threshold, increments an impact counter in response to determining that the drive angle is less than the drive angle threshold, determines whether the impact counter has reached an impact counter threshold, and controls the brushless DC motor in response to determining that the impact counter has reached the impact counter threshold.

In some embodiments, to calculate the drive angle of the anvil caused by the impact based on output from the position sensor, the controller determines a first rotational position of the motor shaft upon a first impact between the hammer and the anvil based on output from the position sensor, determines a second rotational position of the motor shaft upon a second impact between the hammer and the anvil based on output from the position sensor, and determines the drive angle experienced by the output drive device based on the first rotational position and the second rotational position. In some embodiments, to determine the drive angle experienced by the output drive device based on the first rotational position and the second rotational position, the controller determines a difference between the second rotational position and the first rotational position, and subtracts a predetermined angle. The predetermined angle is indicative of an amount of rotation experienced by the hammer from disengaging the anvil to impacting the anvil. In some embodiments, to control the brushless DC motor in response to determining that the impact counter has reached the impact counter threshold, the controller reduces a speed of the brushless DC motor.

Other aspects of various embodiments will become apparent by consideration of the detailed description and accompanying drawings.

DETAILED DESCRIPTION

Figure 1:
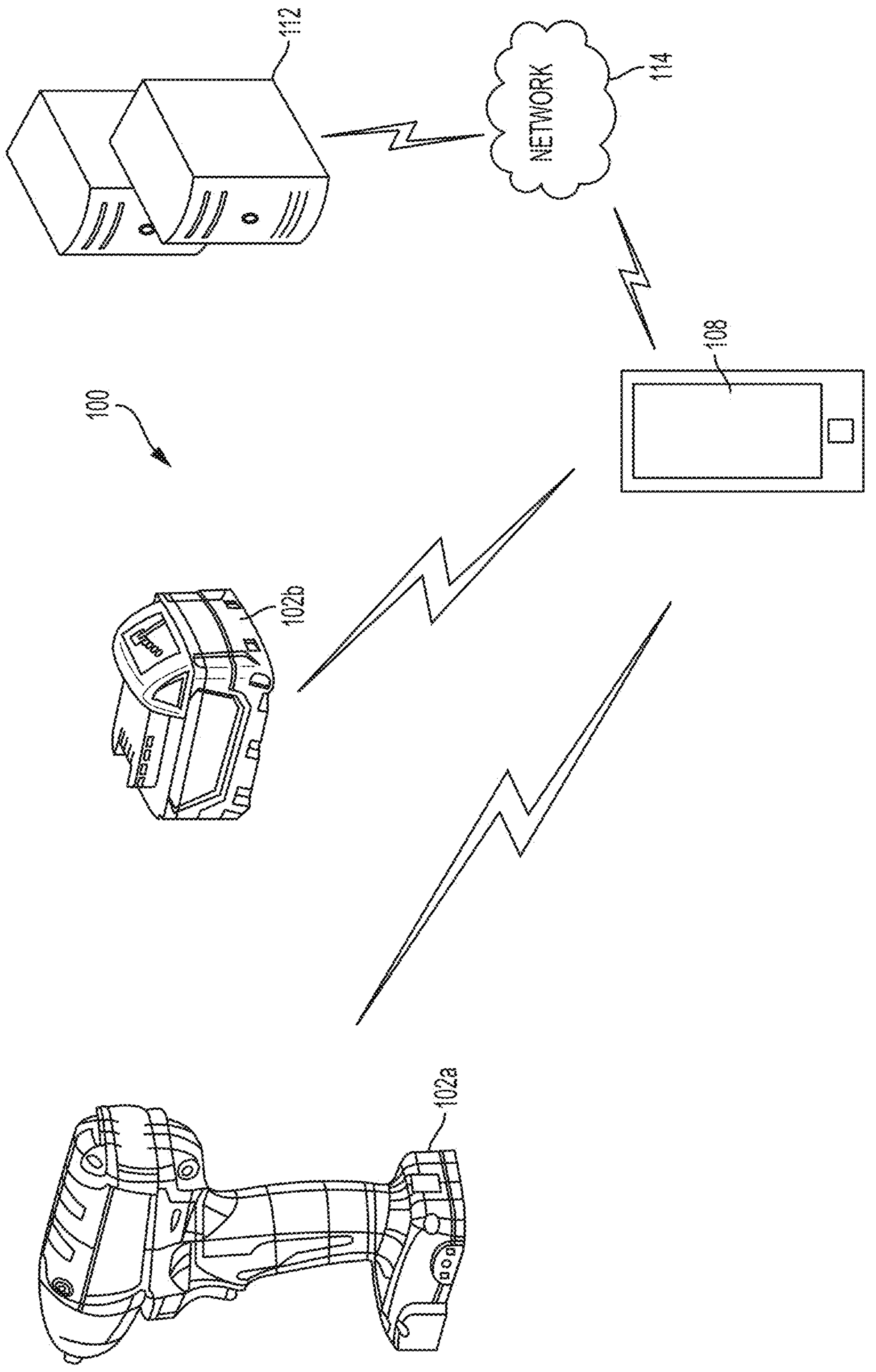
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of “including,” “comprising” or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes power tool devices 102 and an external device 108. Each power tool device 102 (e.g., battery powered impact driver 102*a* and power tool battery pack 102*b*) and the external device 108 can communicate wirelessly while they are within a communication range of each other. Each power tool device 102 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 can also transmit data to the power tool device 102 for power tool configuration, firmware updates, or to send commands (e.g., turn on a work light). The external device 108 also allows a user to set operational parameters, safety parameters, select tool modes, and the like for the power tool device 102.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

The external device 108 includes a communication interface that is compatible with a wireless communication interface or module of the power tool device 102. The communication interface of the external device 108 may include a wireless communication controller (e.g., a Bluetooth® module), or a similar component. The external device 108, therefore, grants the user access to data related to the power tool device 102, and provides a user interface such that the user can interact with the controller of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless interface or with the same wireless interface that the power tool device 102 uses to communicate with the external device 108.

The power tool device 102 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit).

Figure 2:
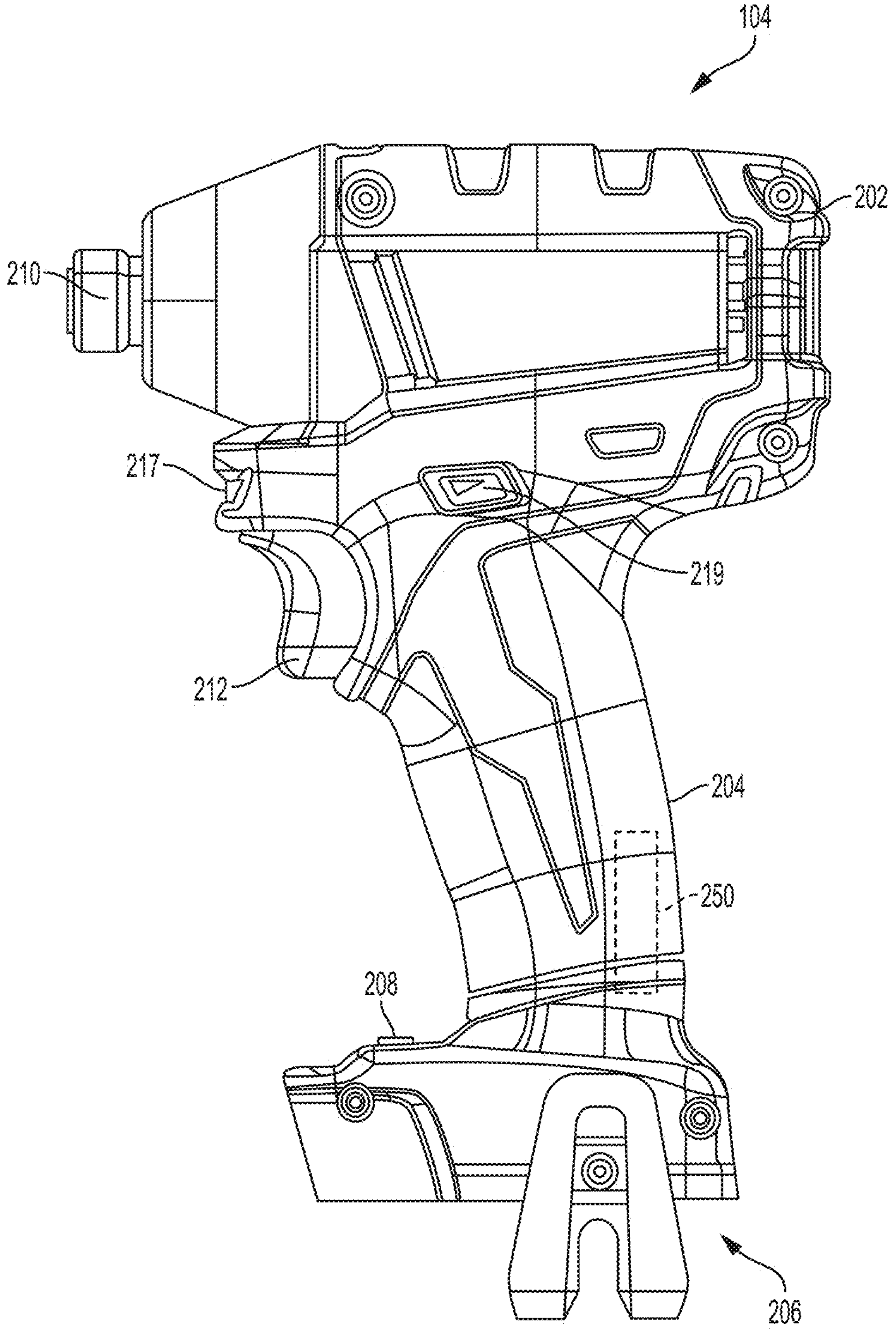
FIG. 2 illustrates a power tool of the communication system.

FIG. 2 illustrates an example of the power tool device 102, an impact driver 104. The impact driver 104 is representative of various types of power tools that operate within the system 100. Accordingly, the description with respect to the impact driver 104 in the system 100 is similarly applicable to other types of power tools, such as other power tools with impact mechanisms (e.g., impact wrenches and impacting angle drivers). As shown in FIG. 2, the impact driver 104 includes an upper main body 202, a handle 204, a battery pack receiving portion 206, mode pad 208, an output drive device 210, a trigger 212, a work light 217, and forward/reverse selector 219. The housing of the impact driver 104 (e.g., the main body 202 and the handle 204) are composed of a durable and light-weight plastic material. The drive device 210 is composed of a metal (e.g., steel). The drive device 210 on the impact driver 104 is a socket. However, other power tools may have a different drive device 210 specifically designed for the task associated with the other power tool. The battery pack receiving portion 206 is configured to receive and couple to the battery pack (e.g., 102*b* of FIG. 1) that provides power to the impact driver 104. The battery pack receiving portion 206 includes a connecting structure to engage a mechanism that secures the battery pack and a terminal block to electrically connect the battery pack to the impact driver 104. The mode pad 208 allows a user to select a mode of the impact driver 104 and indicates to the user the currently selected mode of the impact driver 104, which are described in greater detail below.

Figure 3A:
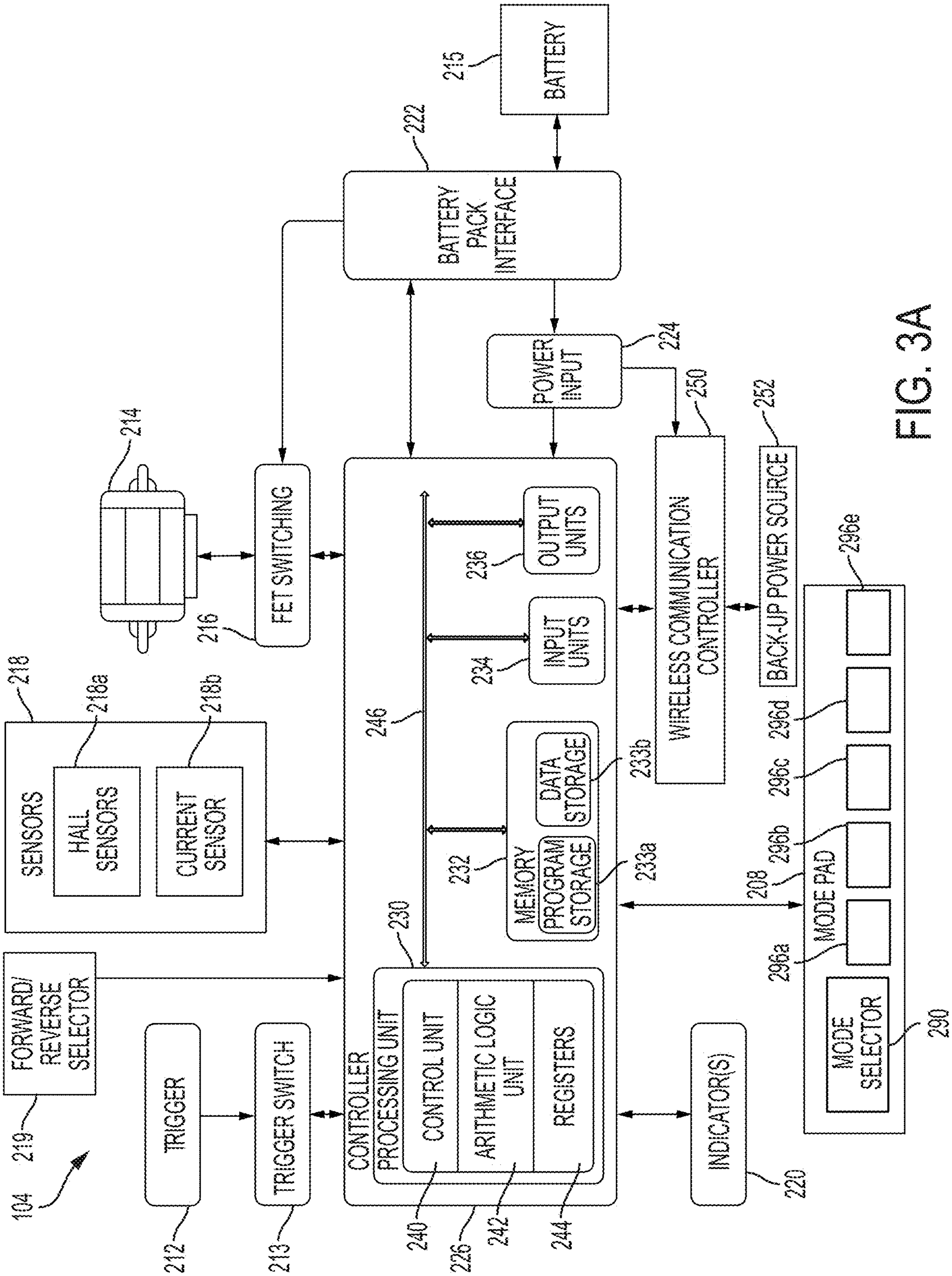
FIGS. 3A-B illustrate a schematic diagram of the power tool.

As shown in FIG. 3A, the impact driver 104 also includes a motor 214. The motor 214 actuates the drive device 210 and allows the drive device 210 to perform the particular task. A primary power source (e.g., a battery pack) 215 couples to the impact driver 104 and provides electrical power to energize the motor 214. The motor 214 is energized based on the position of the trigger 212. When the trigger 212 is depressed the motor 214 is energized, and when the trigger 212 is released, the motor 214 is de-energized. In the illustrated embodiment, the trigger 212 extends partially down a length of the handle 204; however, in other embodiments the trigger 212 extends down the entire length of the handle 204 or may be positioned elsewhere on the impact driver 104. The trigger 212 is moveably coupled to the handle 204 such that the trigger 212 moves with respect to the tool housing. The trigger 212 is coupled to a push rod, which is engageable with a trigger switch 213 (see FIG. 3A). The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the tool housing or electrical trigger switch 213. The trigger switch 213 outputs a signal indicative of the position of the trigger 212. In some instances, the signal is binary and indicates either that the trigger 212 is depressed or released. In other instances, the signal indicates the position of the trigger 212 with more precision. For example, the trigger switch 213 may output an analog signal that various from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. The signal output by the trigger switch 213 may be analog or digital.

As also shown in FIG. 3A, the impact driver 104 also includes a switching network 216, sensors 218, indicators 220, the battery pack interface 222, a power input unit 224, a controller 226, a wireless communication controller 250, and a back-up power source 252. The back-up power source 252 includes, in some embodiments, a coin cell battery (FIG. 4) or another similar small replaceable power source. The battery pack interface 222 is coupled to the controller 226 and couples to the battery pack 215. The battery pack interface 222 includes a combination of mechanical (e.g., the battery pack receiving portion 206) and electrical components configured to and operable for interfacing (e.g., mechanically, electrically, and communicatively connecting) the impact driver 104 with the battery pack 215. The battery pack interface 222 is coupled to the power input unit 224. The battery pack interface 222 transmits the power received from the battery pack 215 to the power input unit 224. The power input unit 224 includes active and/or passive components (e.g., voltage step-down controllers, voltage converters, rectifiers, filters, etc.) to regulate or control the power received through the battery pack interface 222 and to the wireless communication controller 250 and controller 226.

The switching network 216 enables the controller 226 to control the operation of the motor 214. Generally, when the trigger 212 is depressed as indicated by an output of the trigger switch 213, electrical current is supplied from the battery pack interface 222 to the motor 214, via the switching network 216. When the trigger 212 is not depressed, electrical current is not supplied from the battery pack interface 222 to the motor 214.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous FETs, bipolar transistors, or other types of electrical switches. For instance, the switching network 216 may include a six-FET bridge that receives pulse-width modulated (PWM) signals from the controller 226 to drive the motor 214.

The sensors 218 are coupled to the controller 226 and communicate to the controller 226 various signals indicative of different parameters of the impact driver 104 or the motor 214. The sensors 218 include Hall sensors **218*a*, current sensors 218*b*, among other sensors, such as, for example, one or more voltage sensors, one or more temperature sensors, and one or more torque sensors. Each Hall sensor 218*a* outputs motor feedback information to the controller 226, such as an indication (e.g., a pulse) when a magnet of the motor's rotor rotates across the face of that Hall sensor. Based on the motor feedback information from the Hall sensors 218*a*, the controller 226 can determine the position, velocity, and acceleration of the rotor. In response to the motor feedback information and the signals from the trigger switch 213, the controller 226 transmits control signals to control the switching network 216 to drive the motor 214. For instance, by selectively enabling and disabling the FETs of the switching network 216, power received via the battery pack interface 222 is selectively applied to stator coils of the motor 214 to cause rotation of its rotor. The motor feedback information is used by the controller 226 to ensure proper timing of control signals to the switching network 216 and, in some instances, to provide closed-loop feedback to control the speed of the motor 214** to be at a desired level.

The indicators 220 are also coupled to the controller 226 and receive control signals from the controller 226 to turn on and off or otherwise convey information based on different states of the impact driver 104. The indicators 220 include, for example, one or more light-emitting diodes ("LED"), or a display screen. The indicators 220 can be configured to display conditions of, or information associated with, the impact driver 104. For example, the indicators 220 are configured to indicate measured electrical characteristics of the impact driver 104, the status of the impact driver 104, the mode of the power tool (discussed below), etc. The indicators 220 may also include elements to convey information to a user through audible or tactile outputs.

As described above, the controller 226 is electrically and/or communicatively connected to a variety of modules or components of the impact driver 104. In some embodiments, the controller 226 includes a plurality of electrical and electronic components that provide power, operational control, and protection to the components and modules within the controller 226 and/or impact driver 104. For example, the controller 226 includes, among other things, a processing unit 230 (e.g., a microprocessor, a microcontroller, or another suitable programmable device), a memory 232, input units 234, and output units 236. The processing unit 230 (herein, electronic processor 230) includes, among other things, a control unit 240, an arithmetic logic unit ("ALU") 242, and a plurality of registers 244 (shown as a group of registers in FIG. 3A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233*a* and a data storage area 233*b*. The program storage area 233*a* and the data storage area 233*b* can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the impact driver 104 can be stored in the memory 232 of the controller 226. The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232 including operational data, information identifying the type of tool, a unique identifier for the particular tool, and other information relevant to operating or maintaining the impact driver 104. The tool usage information, such as current levels, motor speed, motor acceleration, motor direction, number of impacts, may be captured or inferred from data output by the sensors 218. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the foot of the impact driver 104 (see FIG. 2) to save space and ensure that the magnetic activity of the motor 214 does not affect the wireless communication between the impact driver 104 and the external device 108. As a particular example, in some embodiments, the wireless communication controller 250 is positioned under the mode pad 208.

Figure 3B:
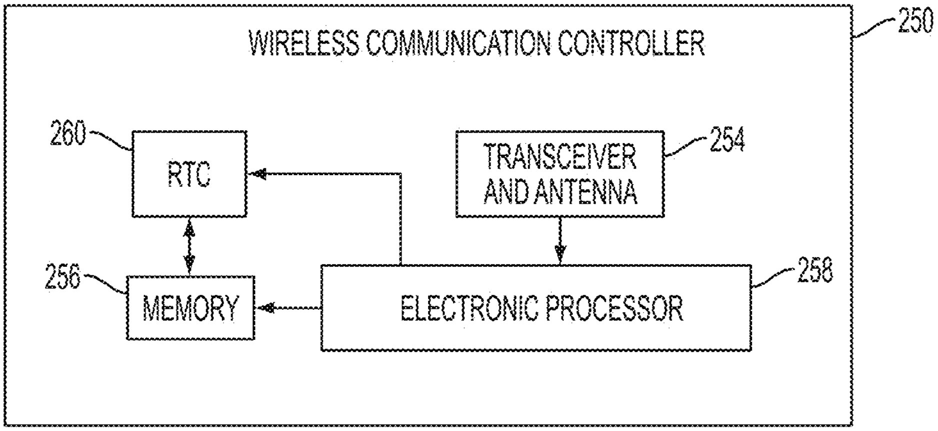

As shown in FIG. 3B, the wireless communication controller 250 includes a radio transceiver and antenna 254, a memory 256, an electronic processor 258, and a real-time clock 260. The radio transceiver and antenna 254 operate together to send and receive wireless messages to and from the external device 108 and the electronic processor 258. The memory 256 can store instructions to be implemented by the electronic processor 258 and/or may store data related to communications between the impact driver 104 and the external device 108 or the like. The electronic processor 258 for the wireless communication controller 250 controls wireless communications between the impact driver 104 and the external device 108. For example, the electronic processor 258 associated with the wireless communication controller 250 buffers incoming and/or outgoing data, communicates with the controller 226, and determines the communication protocol and/or settings to use in wireless communications.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the impact driver 104 are within a communication range (i.e., in proximity) of each other while they exchange data. In other embodiments, the wireless communication controller 250 communicates using other protocols (e.g., Wi-Fi, cellular protocols, a proprietary protocol, etc.) over a different type of wireless network. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the impact driver 104 and the external device/network 108 from third parties.

The wireless communication controller 250 is configured to receive data from the power tool controller 226 and relay the information to the external device 108 via the transceiver and antenna 254. In a similar manner, the wireless communication controller 250 is configured to receive information (e.g., configuration and programming information) from the external device 108 via the transceiver and antenna 254 and relay the information to the power tool controller 226.

The RTC 260 increments and keeps time independently of the other power tool components. The RTC 260 receives power from the battery pack 215 when the battery pack 215 is connected to the impact driver 104 and receives power from the back-up power source 252 when the battery pack 215 is not connected to the impact driver 104. Having the RTC 260 as an independently powered clock enables time stamping of operational data (stored in memory 232 for later export) and a security feature whereby a lockout time is set by a user and the tool is locked-out when the time of the RTC 260 exceeds the set lockout time.

The memory 232 stores various identifying information of the impact driver 104 including a unique binary identifier (UBID), an ASCII serial number, an ASCII nickname, and a decimal catalog number. The UBID both uniquely identifies the type of tool and provides a unique serial number for each impact driver 104. Additional or alternative techniques for uniquely identifying the impact driver 104 are used in some embodiments.

Figure 4:
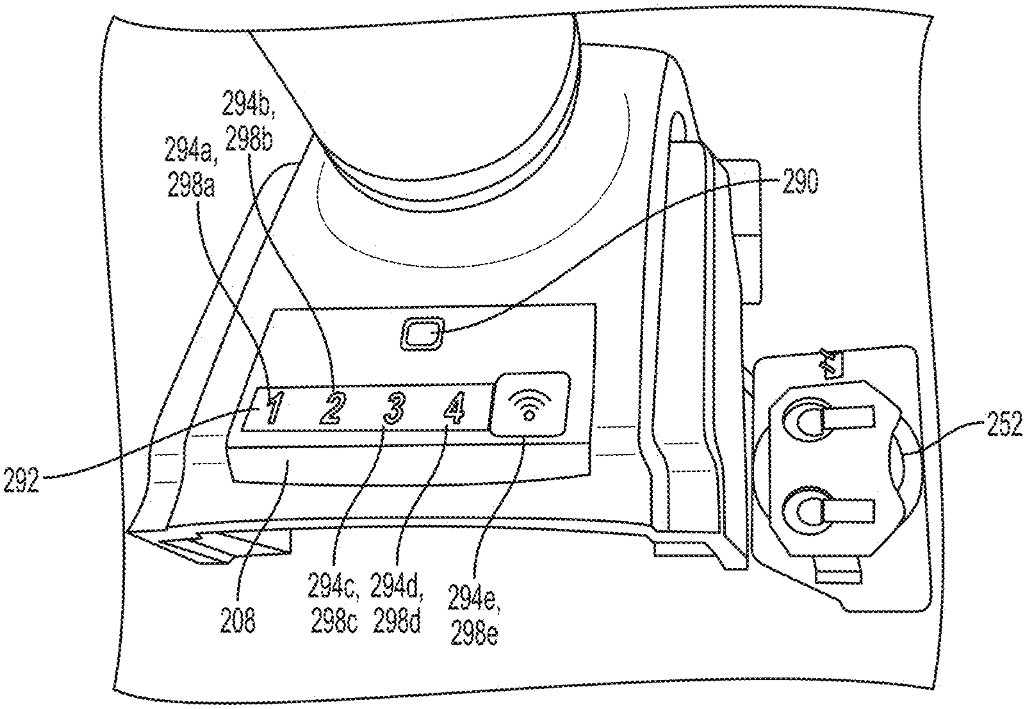
FIG. 4 illustrates a mode pad of the power tool.

FIG. 4 illustrates a more detailed view of the mode pad 208. The mode pad 208 is a user interface on the foot of the impact driver 104 that allows the impact driver 104 to switch between different operating modes. The mode pad 208 includes the mode selection switch 290 and mode indicator LEDs block 292 having mode indicators 294*a-e*, each mode indicator 294*a-e* including one of LEDs 296*a-e* (see FIG. 3A) and an associated one of indicating symbols 298*a-e* (e.g., "1", "2", "3", "4", and a radio wave symbol). When an LED 296 is enabled, the associated indicating symbol 298 is illuminated. For instance, when LED 296*a* is enabled, the "1" (indicating symbol 298*a*) is illuminated.

The impact driver 104 has five selectable modes (one, two, three, four, and adaptive), each associated with a different one of the mode indicators 294*a-e*. The mode selection switch 290 is a pushbutton that cycles through the five selectable modes upon each press (e.g., mode 1, 2, 3, 4, adaptive, 1, 2, and so on). The adaptive mode is represented by the indicating symbol 298*e* (the radio wave symbol). In the adaptive mode, the user is able to configure the impact driver 104 via the external device 108, as is described in further detail below. In other embodiments, the impact driver 104 has more or fewer modes, and the mode selection switch 290 may be a different type of switch such as, for example, a slide switch, a rotary switch, or the like.

Figure 5:
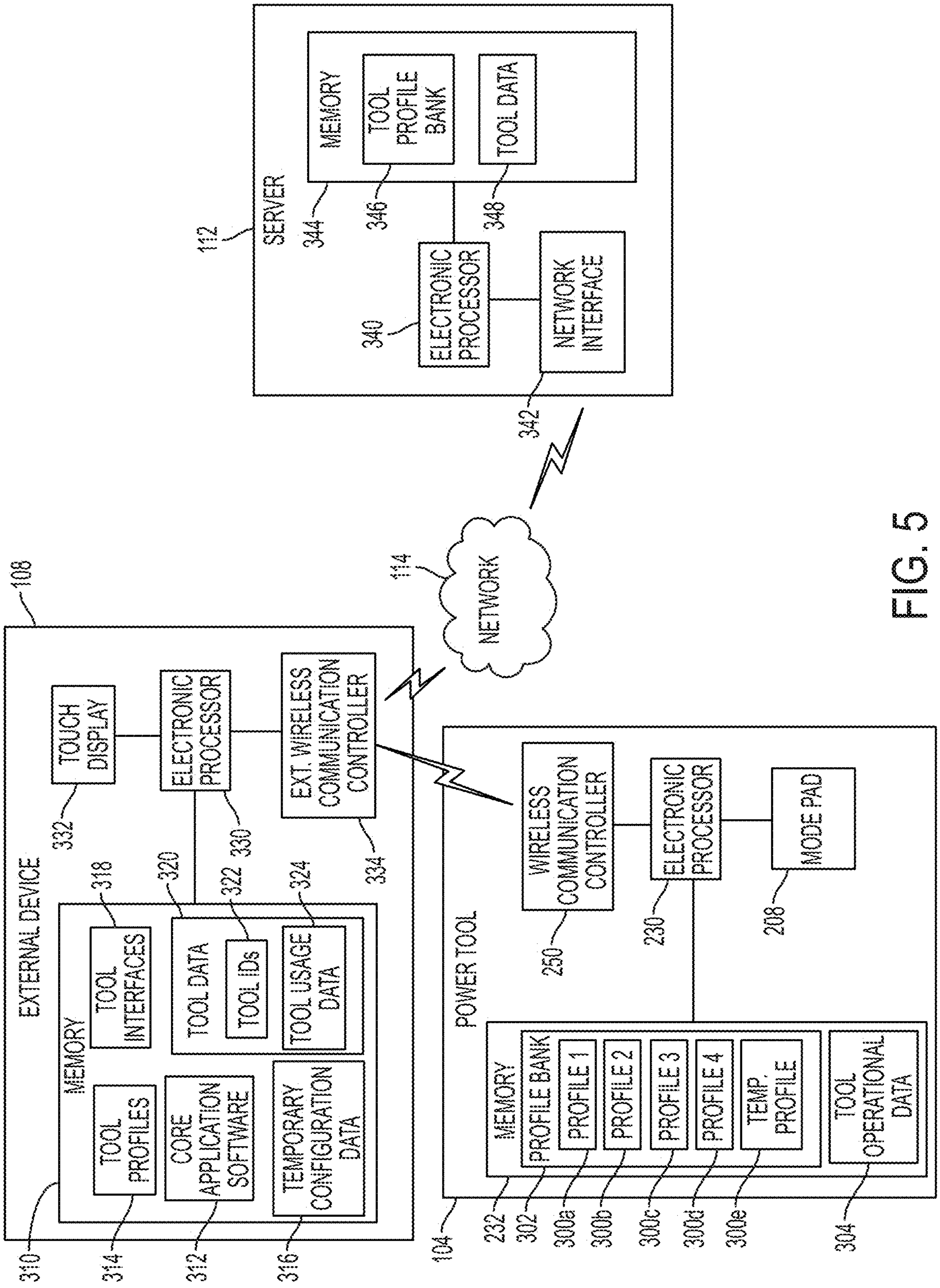
FIG. 5 illustrates a schematic diagram of the communication system including the power tool.

With reference to FIG. 5, modes one, two, three, and four are each associated with a mode profile configuration data block (a "mode profile") 300*a-d*, respectively, saved in the memory 232 in a (mode) profile bank 302. Each mode profile 300 includes configuration data that defines the operation of the tool 104 when activated by the user (e.g., upon depressing the trigger 212). For instance, a particular mode profile 300 may specify the motor speed, when to stop the motor, the duration and intensity of the work light 217, among other operational characteristics. The adaptive mode is associated with a temporary mode profile 300*e* saved in the memory 232. Also stored in the memory 232 is tool operational data 304, which includes, for example, information regarding the usage of the impact driver 104 (e.g., obtained via the sensors 218), information regarding the maintenance of the impact driver 104, power tool trigger event information (e.g., whether and when the trigger is depressed and the amount of depression).

The external device 108 includes a memory 310 storing core application software 312, tool mode profiles 314, temporary configuration data 316, tool interfaces 318, tool data 320 including received tool identifiers 322 and received tool usage data 324 (e.g., tool operational data). The external device 108 further includes an electronic processor 330, a touch screen display 332, and an external wireless communication controller 334. The electronic processor 330 and memory 310 may be part of a controller having similar components as the controller 226 of the impact driver 104. The touch screen display 332 allows the external device 108 to output visual data to a user and receive user inputs. Although not illustrated, the external device 108 may include further user input devices (e.g., buttons, dials, toggle switches, and a microphone for voice control) and further user outputs (e.g., speakers and tactile feedback elements). Additionally, in some instances, the external device 108 has a display without touch screen input capability and receives user input via other input devices, such as buttons, dials, and toggle switches. The external device 108 communicates wirelessly with the wireless communication controller 250 via the external wireless communication controller 334, e.g., using a Bluetooth® or Wi-Fi® protocol. The external wireless communication controller 334 further communicates with the server 112 over the network 114. The external wireless communication controller 334 includes at least one transceiver to enable wireless communications between the external device 108 and the wireless communication controller 250 of the power tool 104 or the server 112 through the network 114. In some instances, the external wireless communication controller 334 includes two separate wireless communication controllers, one for communicating with the wireless communication controller 250 (e.g., using Bluetooth® or Wi-Fi® communications) and one for communicating through the network 114 (e.g., using Wi-Fi or cellular communications).

The server 112 includes an electronic processor 340 that communicates with the external device 108 over the network 114 using a network interface 342. The communication link between the network interface 342, the network 114, and the external wireless communication controller 334 may include various wired and wireless communication pathways, various network components, and various communication protocols. The server 112 further includes a memory 344 including a tool profile bank 346 and tool data 348.

Returning to the external device 108, the core application software 312 is executed by the electronic processor 330 to generate a graphical user interface (GUI) on the touch screen display 332 enabling the user to interact with the impact driver 104 and server 112. In some embodiments, a user may access a repository of software applications (e.g., an "app store" or "app marketplace") using the external device 108 to locate and download the core application software 312, which may be referred to as an "app." In some embodiments, the tool mode profiles 314, tool interfaces 318, or both may be bundled with the core application software 312 such that, for instance, downloading the "app" includes downloading the core application software 312, tool mode profiles 314, and tool interfaces 318. In some embodiments, the app is obtained using other techniques, such as downloading from a website using a web browser on the external device 108. As will become apparent from the description below, at least in some embodiments, the app on the external device 108 provides a user with a single entry point for controlling, accessing, and/or interacting with a multitude of different types of tools. This approach contrasts with, for instance, having a unique app for each type of tool or for small groupings of related types of tools.

Figure 6:
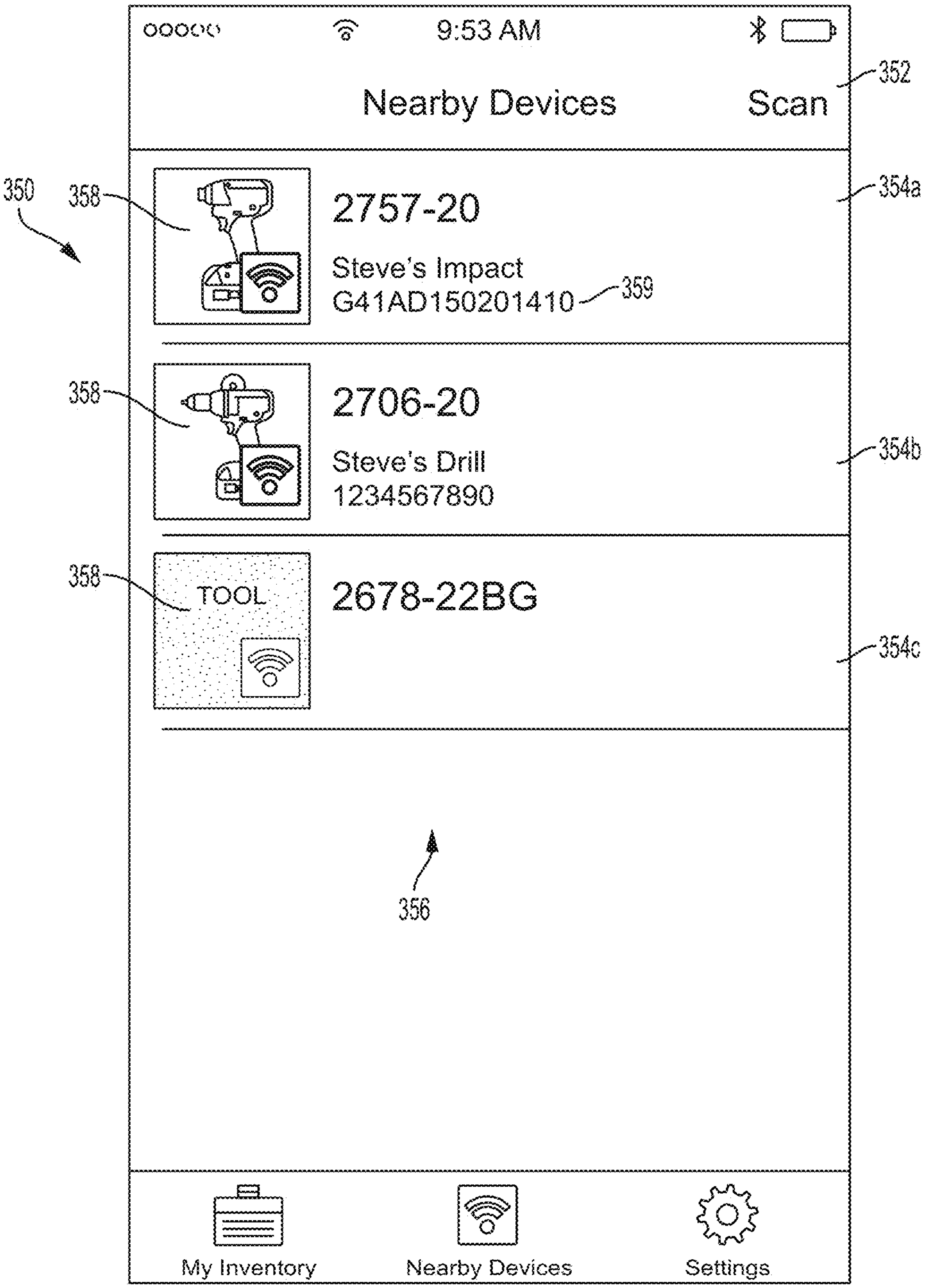
FIGS. 6-11 illustrate exemplary screenshots of a user interface of an external device of the communication system.

FIG. 6 illustrates a nearby devices screen 350 of the GUI on the touch screen display 332. The nearby devices screen 350 is used to identify and communicatively pair with power tools 104 within wireless communication range of the external device 108 (e.g., local power tools). For instance, in response to a user selecting the "scan" input 352, the external wireless communication controller 334 scans a radio wave communication spectrum used by the power tools 104 and identifies any power tools 104 within range that are advertising (e.g., broadcasting their UBID and other limited information). The identified power tools 104 that are advertising are then listed on the nearby devices screen 350. As shown in FIG. 6, in response to a scan, three power tools 104 that are advertising (advertising tools 354*a-c*) are listed in the identified tool list 356. In some embodiments, if a power tool 104 is already communicatively paired with a different external device, the power tool 104 is not advertising and, as such, is not listed in the identified tool list 356 even though the power tool 104 may be nearby (within wireless communication range of) the external device 108. The external device 108 is operable to pair with tools 354 that are in a connectable state. The external device 108 provides a visual state indication 358 in the identified tool list 356 of whether an advertising tool 354 is in the connectable state or the advertising state. For instance, the visual state indication 358 of a tool may be displayed in one color when the tool is in a connectable state and may be displayed in another color when the tool is not in the connectable state. The UBID received from the tools 354 is used by the external device 108 to identify the tool type of each tool 354.

From the nearby devices screen 350, a user can select one of the tools 354 from the identified tool list 356 to communicatively pair with the selected tool 354. Each type of power tool 354 with which the external device 108 can communicate includes an associated tool graphical user interface (tool interface) stored in the tool interfaces 318. Once a communicative pairing occurs, the core application software 312 accesses the tool interfaces 318 (e.g., using the UBID) to obtain the applicable tool interface for the type of tool that is paired. The touch screen 332 then shows the applicable tool interface. A tool interface includes a series of screens enabling a user to obtain tool operational data, configure the tool, or both. While some screens and options of a tool interface are common to multiple tool interfaces of different tool types, generally, each tool interface includes screens and options particular to the associated type of tool. The impact driver 104 has limited space for user input buttons, triggers, switches, and dials. However, the external device 108 and touch screen 332 provide a user the ability to map additional functionality and configurations to the impact driver 104 to change the operation of the tool 104. Thus, in effect, the external device 108 provides an extended user interface for the impact driver 104, providing further customization and configuration of the impact driver 104 than otherwise possible or desirable through physical user interface components on the tool. Examples further explaining aspects and benefits of the extended user interface are found below.

Figure 7:
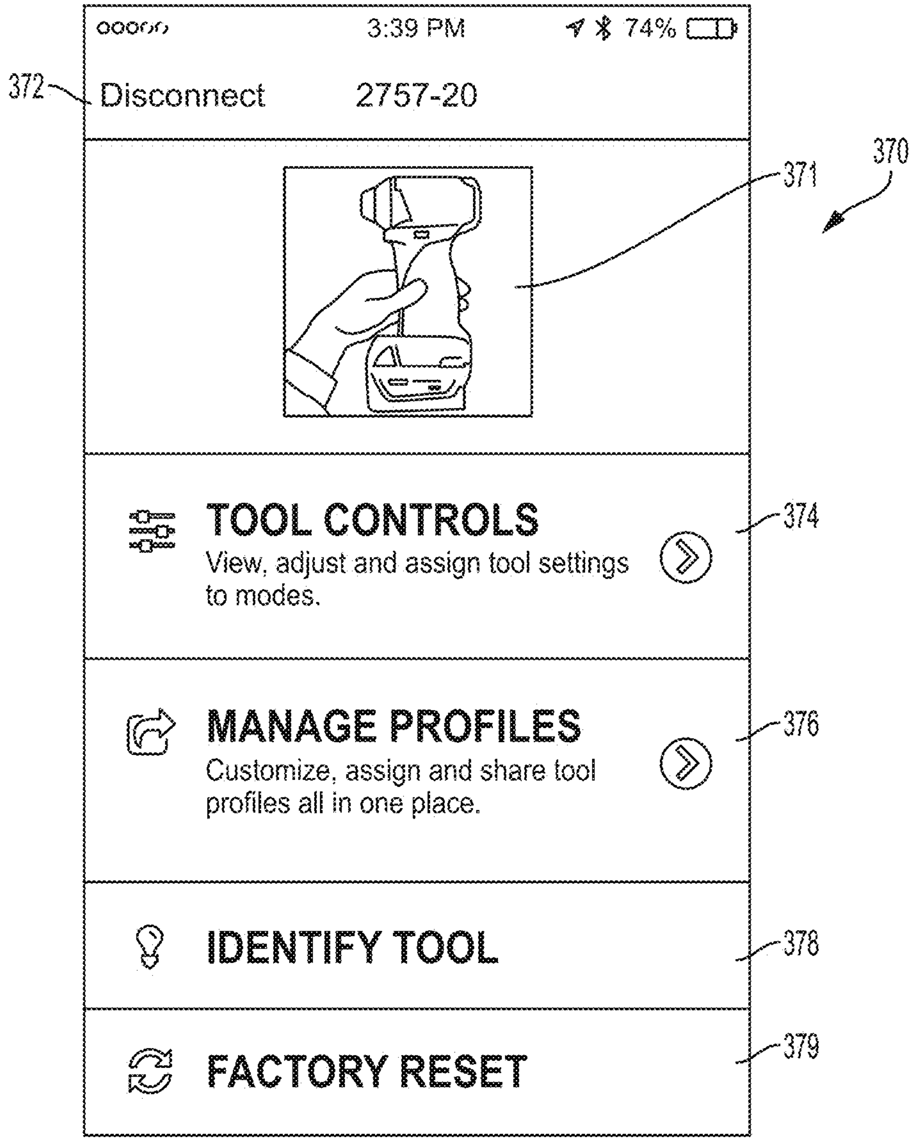

FIG. 7 illustrates a home screen 370 of the tool interface when the power tool 104 is an impact driver. The home screen 370 includes an icon 371 for the particular paired powered tool 104, which may be the same as the icon shown in the list 356. The home screen 370 also includes a disconnect input 372 enabling the user to break the communicative pairing between the external device 108 and the paired impact driver 104. The home screen 370 further includes four selectable options: tool controls 374, manage profiles 376, identify tool 378, and factory reset 379. Selecting identify tool 378 sends a command to the paired impact driver 104 requesting that the paired impact driver 104 provide a user-perceptible indication, such as flashing a work light 217, a light of the indicator 220, flashing LEDs 296, making an audible beep using a speaker of the indicators 220, and/or using the motor 214 to vibrate the tool. The user can then identify the particular tool communicating with the external device 108.

Figure 8B:
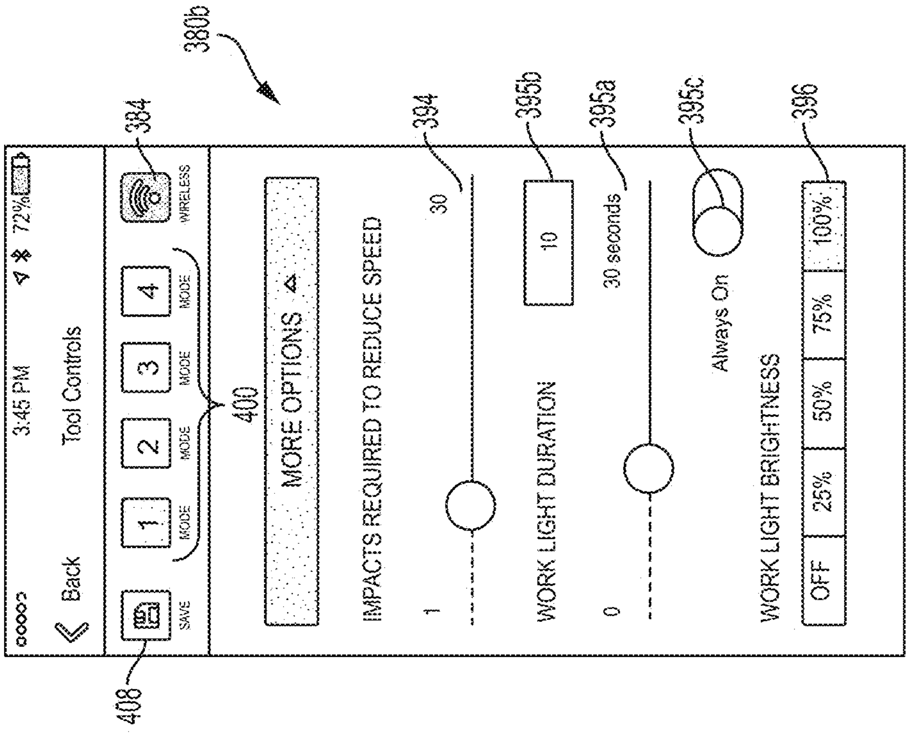
Figure 8A:
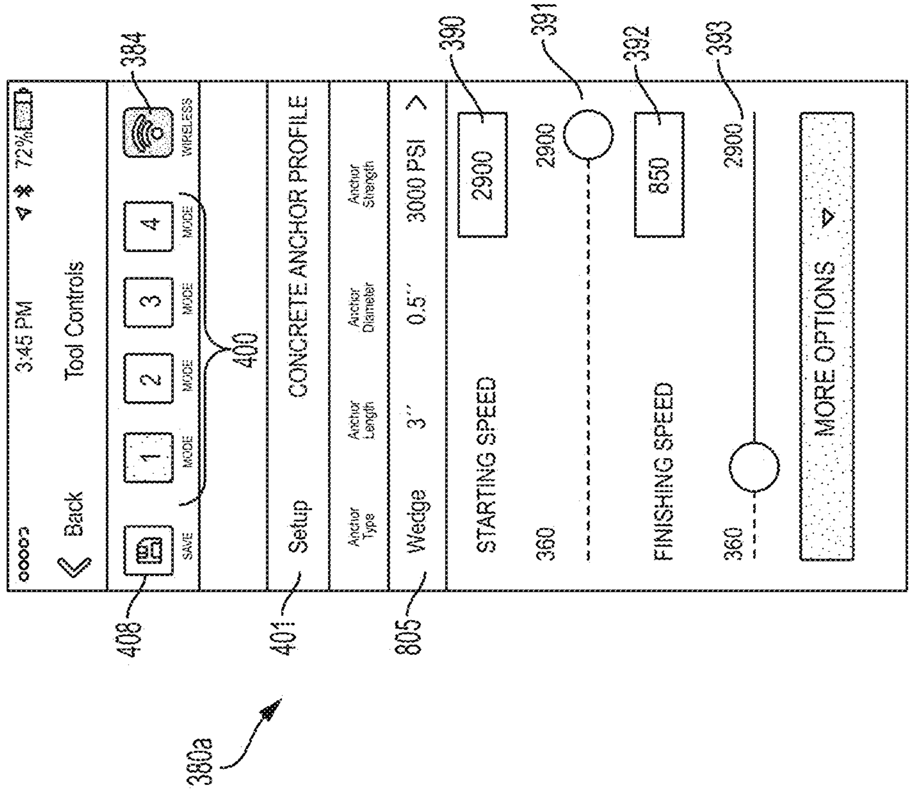

Selecting tool controls 374 causes a control screen of the tool interface to be shown, such as the control screen 380 of FIGS. 8A-B, which includes a top portion 380*a* and a bottom portion 380*b*. Generally, the control screen shown depends on the particular type of profile. In other words, generally, each type of mode profile has a specific control screen. Each control screen has certain customizable parameters that, taken together, form a mode profile. The particular control screen shown on the external device 108 upon selecting the tool controls 374 is the currently selected mode profile of the impact driver 104 (e.g., one of the mode profiles 300*a-e*). To this end, upon selection of the tool controls 374, the external device 108 requests and receives the currently selected one of the mode profiles 300*a-e* from the impact driver 104. The external device 108 recognizes the mode profile type of the selected one of the mode profiles 300*a-e*, generates the appropriate control screen for the mode profile type, and populates the various parameter settings according to settings from the received mode profile 300.

When in the adaptive mode, the currently selected mode profile that is shown on the control screen is the temporary mode profile 300*e*. Additionally, when the impact driver 104 is in the adaptive mode, the impact driver 104 is operated according to the temporary mode profile 300*e*. The source of profile data in the temporarily mode profile 300*e* (and what is being displayed on the control screen 380) varies. Initially, upon entering the adaptive mode via the mode selection switch 290, the mode profile 300*a* (associated with mode 1) is copied into the temporary mode profile 300*e* of the impact driver 104. Thus, after a user causes the impact driver 104 to enter the adaptive mode using the mode selection switch 290, the impact driver 104 initially operates upon a trigger pull as if mode 1 (mode profile 300*a*) was currently selected. Additionally, as the control screen displays the mode profile saved as the temporarily mode profile 300*e*, the mode profile 300*a* that was just copied to the temporary mode profile 300*e* is shown on the control screen.

In some embodiments, another mode profile 300 (e.g., 300*b-d*) is copied into the temporary mode profile 300*e* upon first entering the adaptive mode and is provided (as the temporary mode profile 300*e*) to the external device 108 for populating the control screen 380. In still other embodiments, the control screen shown upon selecting the tool controls 374 is a default control screen with default profile data for the particular type of tool, and the external device 108 does not first obtain profile data from the impact driver 104. In these instances, the default mode profile is sent to the impact driver 104 and saved as the temporary mode profile 300*e*.

Figure 9:
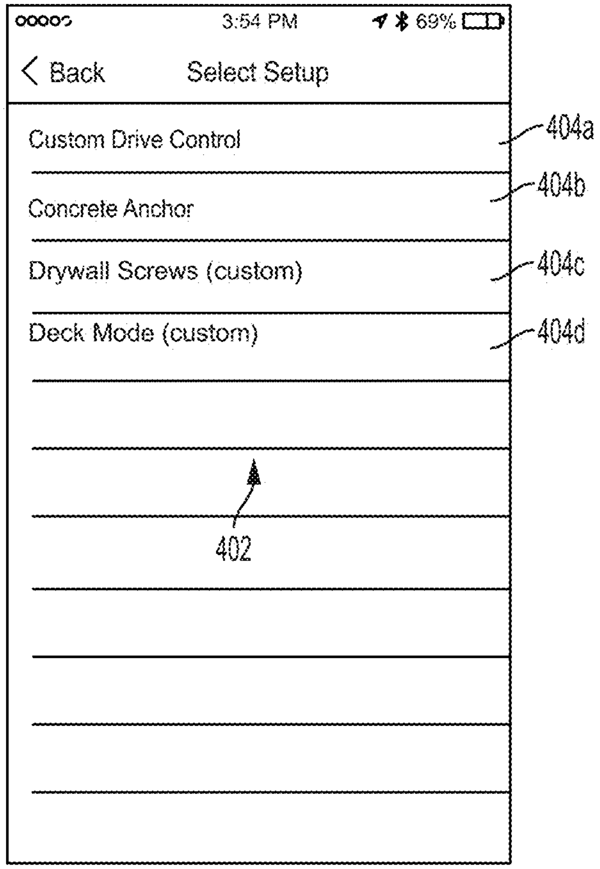

Further, assuming that the impact driver 104 is in the adaptive mode, after the external device 108 initially loads the control screen (e.g., control screen 380) upon selecting the tool controls 374, the user may select a new source of profile data for the temporary file. For instance, upon selecting one of the mode profile buttons 400 (e.g., mode 1, mode 2, mode 3, or mode 4) the associated mode profile 300*a-d* is saved as the temporary mode profile 300*e* and sent to the external device 108 and populates the control screen (according to the mode profile type and mode profile parameters). Additionally, assuming the impact driver 104 is in the adaptive mode, a user may select a mode profile type using the setup selector 401. Upon selecting the setup selector 401, a list of available profiles (profile list) 402 for the particular type of paired impact driver 104 is shown (see, e.g., FIG. 9). The profile list 402 includes profiles 404 obtained from tool profiles 314 and/or from the tool profile bank 346 over the network 114. These listed profiles 404 include default profiles (custom drive control profile 404*a* and concrete anchor profile 404*b*) and custom profiles previously generated and saved by a user (e.g., drywall screws profile 404*c* and deck mode 404*d*), as is described in more detail below. Upon selecting one of the tool profiles 404, the selected profile 404 and its default parameters are illustrated on the control screen 380 of the external device 108 and the profile 404 as currently configured is sent to the impact driver 104 and saved as the temporary mode profile 300*e*. Accordingly, upon a further trigger pull, the impact driver 104 will operate according to the selected one of the tool profiles 404.

When the adaptive mode is currently selected on the impact driver 104, as indicated by the indicating symbol 298*e* (FIG. 4), the user is able to configure (e.g. change some of the parameters of the temporary mode profile 300*e*) the impact driver 104 using the control screen 380. When the impact driver 104 is in one of the other four tool modes, as indicated by one of the indicating symbols 298*a-d*, the impact driver 104 is not currently configurable via the control screen 380. For instance, in FIG. 10, a control screen 381 is illustrated when the power tool is not currently in the adaptive mode. Here, the control screen 381 is similar to the control screen 380, but includes a message 382 indicating that the tool is not in the adaptive mode and a wireless symbol 384 is shown greyed-out as a further indication that the power tool is not in the adaptive mode. Accordingly, when the impact driver 104 is not in the adaptive mode and a user selects one of the mode profile buttons 400, the impact driver 104 provides the mode profile 300 of the associated mode selected by the user, but does not overwrite the temporary mode profile 300*e* with the mode profile. Thus, the mode profiles 300 of the impact driver 104 are not updated when the impact driver 104 is not in the adaptive mode.

Referring back to FIGS. 8A-B, when the impact driver 104 is in the adaptive mode and the user selects the tool controls 374 on the home screen, the user is able to configure profile data of the impact driver 104 using a control screen of the tool interface. For instance, via the control screen 380, the user is able to configure the current profile data of the temporary mode profile 300*e* of the impact driver 104. As illustrated, the user is able to adjust the starting speed via the speed text box 390 or the speed slider 391; adjust the finishing speed via the speed text box 392 or the speed slider 393; alter the impacts required to reduce speed via slider 394; adjust the work light duration with slider 395*a*, work light text box 395*b*, and "always on" toggle 395*c*; and adjust the work light intensity via the work light brightness options 396.

In some embodiments, the external device 108 and impact driver 104 enable live updating of the temporary mode profile 300*e*. When live updating, the temporary mode profile 300*e* of the impact driver 104 is updated as changes to the parameters are made on the control screen 380 without requiring a subsequent saving step or actuation being taken by the user on the GUI of the external device 108 or on the power tool. In other words, when live updating, the external device 108 updates the temporary mode profile 300*e* on the impact driver 104 in response to receiving a user input changing one of the parameters, rather than in response to a user input saving the temporary mode profile 300*e*. For instance, with respect to FIG. 8A, the starting speed of the impact driver 104 is set to 2900 revolutions per minute (RPM). When live updating, if a user slides the speed slider 391 to the left by dragging his/her finger across the speed slider 391 and then removing his/her finger from the touch screen 332 of the external device 108 upon reaching a new speed, the external device 108 will send the newly selected starting speed to the impact driver 104 to update the temporary mode profile 300*e* when the user's finger is removed from the screen, without requiring a further depression of a button or other actuation by the user. Live updating is applicable to the other parameters on the control screen 380 as well, such as the impacts required to reduce speed and work light parameters. Live updating enables rapid customization of the impact driver 104 so that a user may test and adjust various profile parameters quickly with fewer key presses. In contrast to live updating, in some embodiments, after sliding the speed slider 391 to the new speed, the user must press a save button (e.g., save button 408) to effect the update of the starting speed parameter on the temporary mode profile 300*e* .

Figure 11:
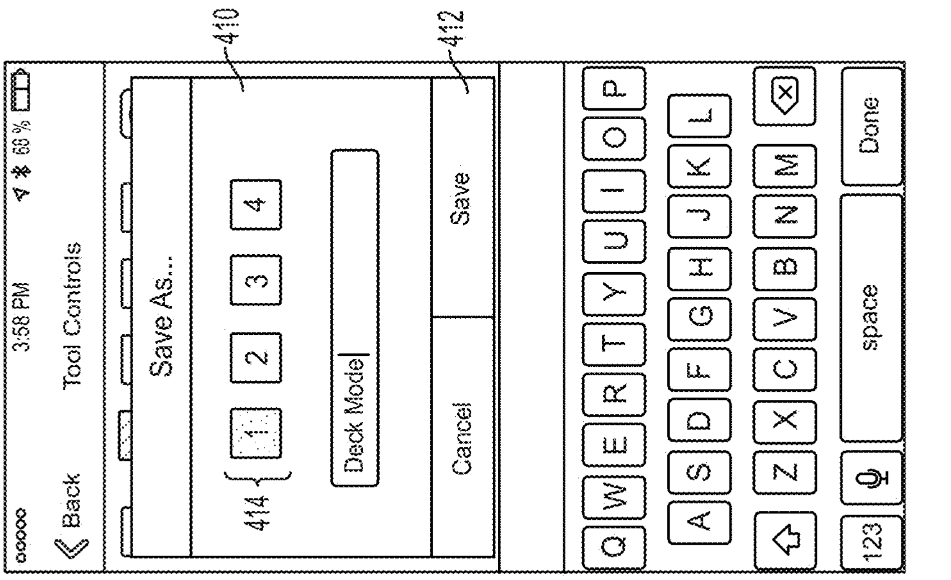

A user is also able to save a mode profile set via a control screen (e.g., the control screen 380) to the impact driver 104. More particularly, the user is able to overwrite one of the mode profiles 300*a-d* in the profile bank 302 with the mode profile as specified on a control screen. To save the mode profile generated by the user via the control screen 308, the user selects the save button 408. As shown in FIG. 11, pressing the save button causes the core application software to generate a save prompt 410 requesting the user to name the created mode profile and specify which of the mode profiles 300*a-d* to overwrite with the created mode profile. In response to the user input, the external device 108 sends the generated mode profile to the impact driver 104. The electronic processor 230 receives the generated mode profile and overwrites the mode profiles 300 in the profile bank 302 specified for overwriting by the user with the generated mode profile. For example, in FIG. 11, the user has named the generated mode profile "Deck Mode" and specified that the electronic processor 230 overwrite mode profile 300*a* (associated with mode "1") with the generated "Deck Mode" mode profile. In some embodiments, the user can elect to overwrite more than one mode profile 300*a-e* with the generated mode profile by selecting multiple of the mode labels 414 before selecting the save button 412. In some embodiments, the user can elect to not overwrite any of the mode profiles 300*a-e* with the generated mode profile by not selecting any of the mode labels 414 before selecting the save button 412. In such embodiments, the generated mode profile is saved in the profile bank 346 on the server 112, but not on the impact driver 104. Overwriting a profile (old profile) with another profile (new profile) may include, for example, storing the new profile at the location in memory that was storing the old profile, thereby erasing the old profile and replacing it in memory with the new profile, or may include storing the new profile at another location in memory and updating a profile pointer to point to the address in memory having the new profile instead of the address in memory having the old profile.

Figure 10:
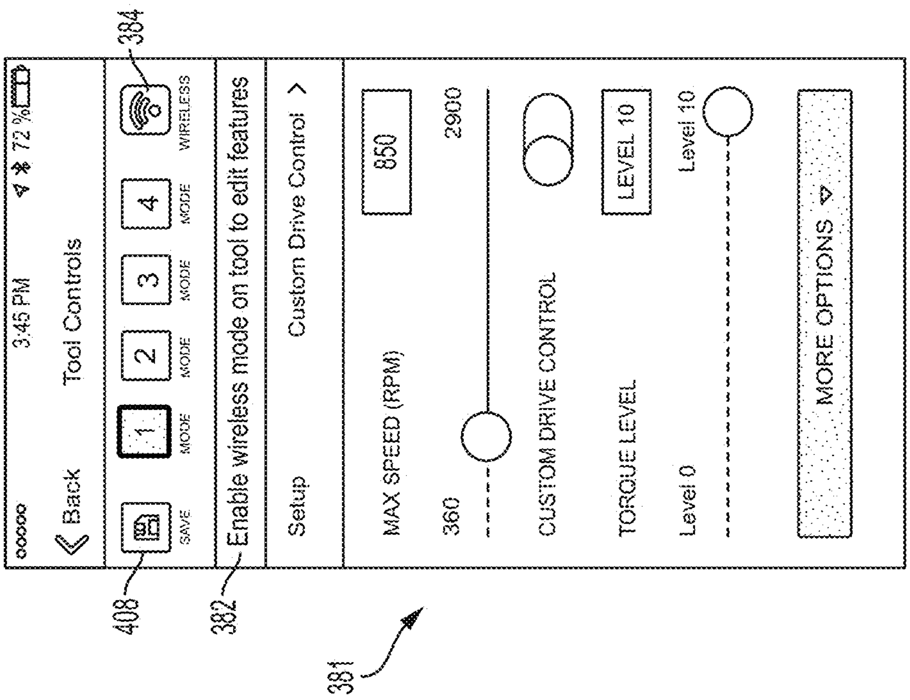

As noted above, in some embodiments, the external device 108 cannot overwrite data of the profiles 300 unless the impact driver 104 is in the adaptive mode (see FIG. 10). This aspect prevents a potentially malicious individual, separate from the user currently operating the impact driver 104, from adjusting tool parameters of the impact driver 104 unless the user places the impact driver 104 in the adaptive mode. Thus, a user of the impact driver 104 can prevent others from adjusting parameters by operating the impact driver 104 in one of the other four modes. In some embodiments, to implement this aspect, a hardware or firmware based interlock prevents the electronic processor 230 from writing to the profile bank 302 unless the impact driver 104 is in the adaptive mode. Furthermore, when the impact driver 104 is in operation, a hardware or firmware based interlock prevents the electronic processor 230 from writing to the profile bank 302. The electronic processor 230 may detect that the impact driver 104 is in operation based on depression of the trigger 212 or outputs from Hall sensors indicating motor spinning. Thus, even when the impact driver 104 is in the adaptive mode, if the impact driver 104 is currently operating, the electronic processor 230 will not update or write to the profile bank 302 even when the impact driver 104 is in the adaptive mode and the external device 108 communicates to the impact driver 104 a generated profile (e.g., in response to a user selecting the save button 408).

Furthermore, in some embodiments, the electronic processor 230 outputs to the external device 108, via the wireless communication controller 250, a signal indicative of whether the impact driver 104 is currently operating. In turn, the external device 108 provides an indication to the user, such as through the wireless symbol 384 changing color (e.g., to red) or flashing and a message when the impact driver 104 is currently operating. Moreover, the ability to update parameters via a control screen is prevented, similar to the control screen 381 of FIG. 10, when the external device 108 receives an indication that the impact driver 104 is currently operating.

Returning to FIG. 7, selecting the factory reset 379 on the home screen 370 causes the external device 108 to obtain default mode profiles from the tool mode profiles 314 or from the tool profile bank 346 on the server 112, and provide the default profiles to the impact driver 104, which then overwrites the profile bank 302 with the default mode profiles.

The home screen 370 may be similar in look and feel for all, many, or several of the tool interfaces 318, although the icon 371 may be customized for the specific tool interface based on the specific power tool with which the external device 108 is paired. Further, the options listed below the icon may add an "obtain data" option that enables the user to select and obtain operational data from the tool for display on the external device 108 and/or sending to the server 112 for storage as part of the tool data 348. Additionally, in instances where a particular tool is not intended to be configured by the external device 108, the tool controls 374 and manage profiles 376 options may be not included on the home screen 370.

In some embodiments, an adaptive mode switch separate from the mode selection switch 290 is provided on the impact driver 104. For instance, LED 296*e* (FIG. 3A) may be a combined LED-pushbutton switch whereby, upon first pressing the combined LED-pushbutton switch, the impact driver 104 enters the adaptive mode and, upon a second pressing of the switch, the impact driver 104 returns to the mode that it was in before first pressing (e.g., mode 1). In this case, the mode selection switch 290 may cycle through modes 1-4, but not the adaptive mode. Furthermore, certain combinations of trigger pulls and/or placement of the forward/reverse selector 219 into a particular position (e.g., neutral) may cause the impact driver 104 to enter and exit the adaptive mode.

Returning to the concept of mode profiles (e.g., profiles 300), a mode profile 300 includes one or more parameters. For instance, returning to FIGS. 8A-B, the mode profile illustrated is the concrete anchor profile, which has the following parameters: starting speed, finishing speed, impacts required to reduce speed, and multiple work light parameters. The particular parameters available for customization on a control screen of the external device 108 varies based on mode profile type.

The control screens of the tool interfaces 318 place bounds on the values that a user can enter for a particular parameter. For instance, in FIG. 8A, the starting speed cannot be set above 2900 RPM or below 360 RPM. The impact driver 104 further includes a boundary check module, e.g., in firmware stored on the memory 232 and executed by the electronic processor 230. At the time of receiving a new profile from the external device 108 for saving in the profile bank 302, the boundary check module confirms that each parameter of each feature is within maximum and minimum boundaries or is otherwise a valid value for the particular parameter. For instance, the boundary check module confirms that the starting speed set for the concrete anchor profile is within the range of 360 RPM to 2900 RPM. In some instances, the boundary check module confirms the parameter values of the features of the power tool's current profile are within acceptable boundaries upon each trigger pull. To carry out the boundary check, the firmware may include a list of parameters for each feature and the applicable maximum and minimum boundaries stored in, for instance, a table, and the electronic processor 230 is operable to perform comparisons with the table data to determine whether the parameter values are within the acceptable boundaries. The boundary check module provides an additional layer of security to protect against a maliciously generated or corrupted profiles, features, and parameter values.

Upon the boundary check module determining that a parameter value is outside of an acceptable range, the controller 226 is operable to output an alert message to the external device 108 that indicates the error (which may be displayed in text on the touch screen 332), drive indicators 220, LEDs 296*a-e*, vibrate the motor, or a combination thereof.

On some control screens of tool interfaces 318, a parameter assist block is provided. The parameter assist block includes work factor inputs that allow a user to specify details of the workpiece on which the power tool will operate (e.g., material type, thickness, and/or hardness), details on fasteners to be driven by the power tool (e.g., material type, screw length, screw diameter, screw type, and/or head type), and/or details on an output unit of the power tool (e.g., saw blade type, number of saw blade teeth, drill bit type, and/or drill bit length). For instance, the concrete anchor profile control screen 380 includes a parameter assist block 805, as shown in FIGS. 8A-B. The parameter assist block 805 includes work factor inputs that allow a user to specify an anchor type (e.g., wedge or drop-in), an anchor length, an anchor diameter, and concrete strength (e.g., in pounds per square inch (PSI)). For instance, by selecting the parameter assist block 805, a parameter assist screen is generated on which the user can specify each of the work factor inputs by cycling through values using the touch screen 332. Upon completing entry of the work factor inputs, the external device 108 adjusts parameters of the profile. For instance, in FIGS. 8A and 8B, the values of the starting speed parameter, finishing speed parameter, and impacts required to reduce speed parameter are adjusted by the external device 108 based on the work factor inputs of the parameter assist block 805. If desired, the user may be able to further adjust some or all of the parameters (e.g., using a slider on the GUI as shown in FIGS. 8A and 8B). Different parameter assist blocks are provided for different profile types, and each parameter assist block may include work factor inputs appropriate to the particular profile type. Furthermore, one or more boundary values of the parameters on the control screen 380 may be adjusted by the external device 108 based on the work factor inputs of the parameter assist block 805. For example, the maximum speed selectable by the user for the starting speed parameter may be adjusted based on the concrete strength input of the parameter assist block 805.

As shown in FIG. 8A, the parameters of the concrete anchor profile include two user adjustable parameters of the same parameter type (motor speed) that are applicable at different stages (or zones) of a single tool operation (fastening). More specifically, for the concrete anchor profile, the control screen 380 is operable to receive user selections specifying a starting motor speed during the starting stage and driving stage of a fastening operation and a finishing speed during a final/finishing stage of the fastening operation. The controller 226 determines when the different stages of the fastening operation occur and are transitioned between as will be explained in greater detail below. In some embodiments, in the various stages of the concrete anchor profile, the controller 226 drives the motor 214 at the user-selected speeds regardless of the amount depression of the trigger 212, as long as the trigger 212 is at least partially depressed. In other words, the speed of the motor 214 does not vary based on the amount of depression of the trigger 212. In other embodiments, the user-selected speeds in the concrete anchor profile are treated as maximum speed values. Accordingly, in these embodiments, the speed of the motor 214 varies based on the amount of depression of the trigger 212, but the controller 226 ensures that the motor 214 does not exceed the user-selected speeds for the various stages.

The concrete anchor profile can be implemented on the impact driver 104 for use during masonry applications, such as when using the impact driver 104 to drive an anchor into concrete. Use of the concrete anchor profile can improve repeatability from one concrete anchor to the next, and reduce breaking of anchors caused by applying too much torque or driving with too much speed (e.g., by detecting when anchors are seated within a joint). Unlike some other driving applications, when driving into concrete, the impact driver 104 may begin impacting almost immediately. Accordingly, whether an anchor is seated within a joint cannot be determined by solely detecting when the impact driver 104 begins impacting (i.e., because the impact driver 104 may be impacting during the entire operation). The concrete anchor profile allows the controller 226 to detect when anchors are seated within a joint and, in response, reduce the motor speed to the finishing speed.

In particular, when operating in the concrete anchor profile, the controller 226 can initially control the motor 214 to operate at a starting speed set by the user. The controller 226 then monitors characteristics of the rotation of the motor 214 and determines whether impacts are occurring on the impact driver 104, as will be explained in greater detail below. After a certain motor rotation characteristic is detected, the controller 226 controls the motor 214 to operate at a slower speed (i.e., a finishing speed). In some embodiments, the external device 108 restricts the finishing speed to be less than the starting speed. For example, if the starting speed is set to 2000 RPM on the control screen 380*a*, the external device 108 may prevent the finishing speed from being set to a value of 2000 RPM or above.

The controller 226 adjusts the speed of the motor 214 based on an angle detection method that calculates an inferred position of the output drive device 210. In particular, the controller 226 detects when impacts occur on the impact driver 104 based on, for example, detecting a change in acceleration, amount of instantaneous current or change in current, impact sounds using a microphone, or impact vibrations using an accelerometer. The controller 226 may use an impact counter (for example, implemented by execution of software on the memory 232) that the controller 226 increments upon each detected impact. Additionally, using Hall sensors 218*a*, the controller 226 also monitors the rotational position of the shaft of the motor 214 including the rotational position of the shaft when each impact occurs.

Figure 12A:
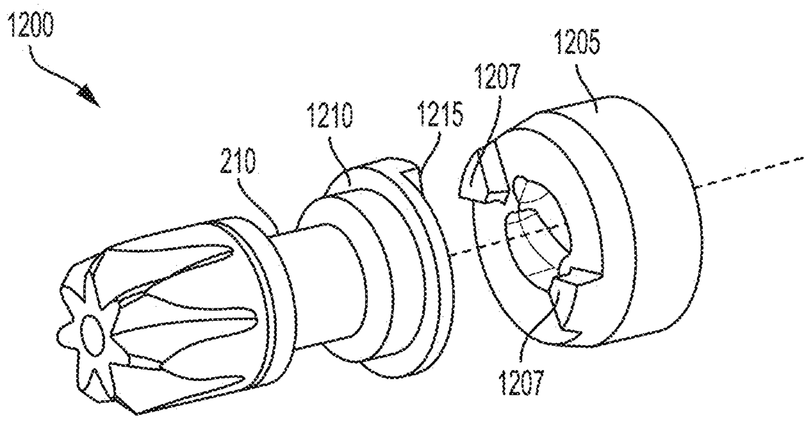
FIGS. 12A and 12B illustrate an impact mechanism of an impact driver according to one embodiment.
Figure 12B:
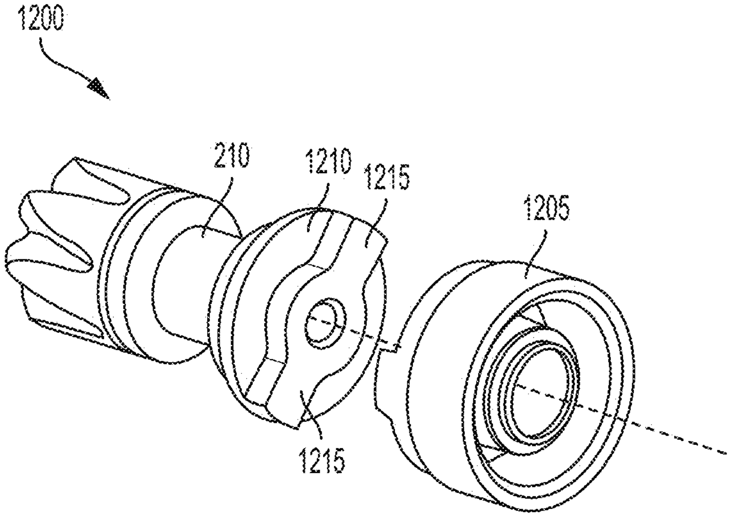

FIGS. 12A and 12B show an impact mechanism 1200, which is an example of an impact mechanism of the impact driver 104. Based on the design of the impact mechanism 1200 of the impact driver 104, the motor 214 rotates at least a predetermined number of degrees between impacts (i.e., 180 degrees for the impact mechanism 1200). The impact mechanism 1200 includes a hammer 1205 with outwardly extending lugs 1207 and an anvil 1210 with outwardly extending lugs 1215. The anvil 1210 is coupled to the output drive device 210. During operation, impacting occurs when the anvil 1210 encounters a certain amount of resistance, e.g., when driving a fastener into a workpiece. When this resistance is met, the hammer 1205 continues to rotate. A spring coupled to the back-side of the hammer 1205 causes the hammer 1205 to disengage the anvil 1210 by axially retreating. Once disengaged, the hammer 1205 will advance both axially and rotationally to again engage (i.e., impact) the anvil 1210. When the impact mechanism 1200 is operated, the hammer lugs 1207 impact the anvil lugs 1215 every 180 degrees. Accordingly, when the impact driver 104 is impacting, the hammer 1205 rotates 180 degrees without the anvil 1210, impacts the anvil 1210, and then rotates with the anvil 1210 a certain amount before repeating this process. For further reference on the functionality of the impact mechanism 1200, see, for instance, the impact mechanism discussed in U.S. application Ser. No. 14/210,812, filed Mar. 14, 2014, which is herein incorporated by reference.

The controller 226 can determine how far the hammer 1205 and the anvil 1210 rotated together by monitoring the angle of rotation of the shaft of the motor 214 between impacts. For example, when the impact driver 104 is driving an anchor into a softer joint, the hammer 1205 may rotate 225 degrees in between impacts. In this example of 225 degrees, 45 degrees of the rotation includes hammer 1205 and anvil 1210 engaged with each other and 180 degrees includes just the hammer 1205 rotating before the hammer lugs 1207 impact the anvil 1210 again. FIGS. 13-16 illustrate this exemplary rotation of the hammer 1205 and the anvil 1210 at different stages of operation.

Figure 13A:
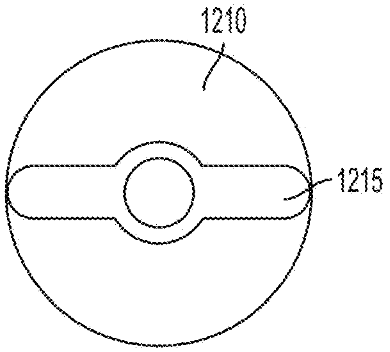
FIGS. 13A-16B illustrate an exemplary operation of a hammer and an anvil of the impact driver according to one embodiment.
Figure 13B:
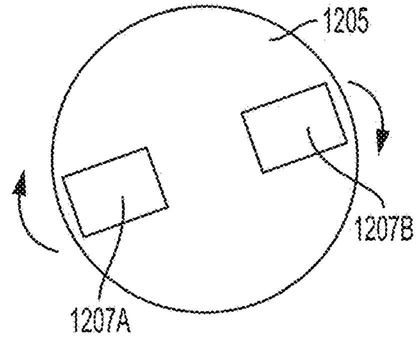
Figure 14A:
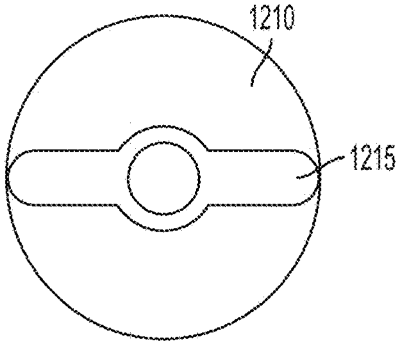
Figure 14B:
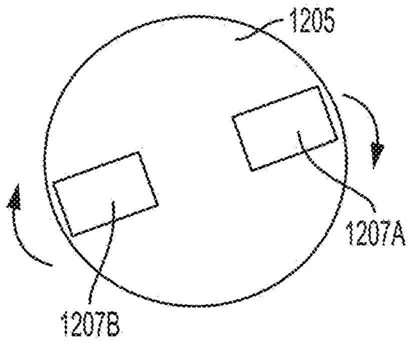

FIGS. 13A and 13B show the rotational positions of the anvil 1210 and the hammer 1205, respectively, just after the hammer 1205 disengages the anvil 1210 (i.e., after an impact and engaged rotation by both the hammer 1205 and the anvil 1210 has occurred). FIG. 13B shows the position of the hammer 1205 just as the hammer 1205 begins to axial retreat from the anvil 1210. In FIGS. 13A and 13B, the hammer 1205 and anvil 1210 are in a first rotational position. After the hammer 1205 disengages the anvil 1210 by axially retreating, the hammer 1205 continues to rotate (as indicated by the arrows in FIG. 13B) while the anvil 1210 remains in the first rotational position. FIGS. 14A and 14B show the rotational positions of the anvil 1210 and the hammer 1205, respectively, just as the next impact is occurring. As shown in FIG. 14A, the anvil 1210 is still located in the first rotational position. As shown in FIG. 14B, the hammer 1205 has rotated 180 degrees to a second rotational position (as indicated by the arrows in FIG. 14B).

Figure 15A:
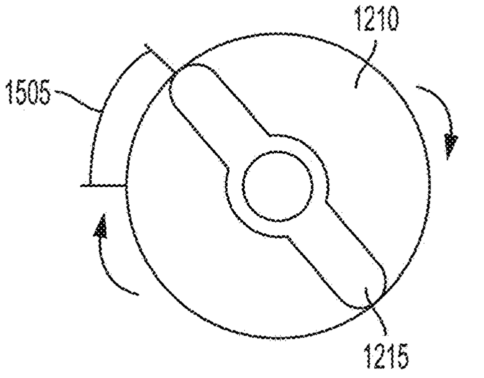
Figure 15B:
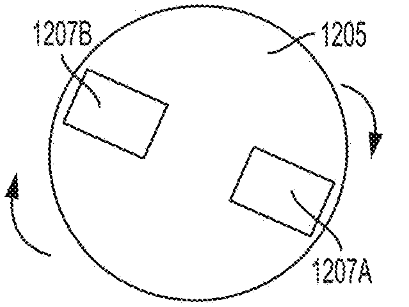

Upon impact, the hammer 1205 and the anvil 1210 rotate together (as indicated by the arrows in FIGS. 15A and 15B) which generates torque that is provided to the output drive device 210 to drive an anchor into concrete, for example. FIGS. 15A and 15B show the rotational positions of the anvil 1210 and the hammer 1205, respectively, after the hammer 1205 again disengages the anvil 1210 by axially retreating. In FIGS. 15A and 15B, the hammer 1205 and anvil 1210 are in a third rotational position that is approximately 45 degrees from the second rotational position as indicated by drive angle 1505. The drive angle 1505 indicates the number of degrees that the anvil 1210 rotated which corresponds to the number of degrees that the output drive device 210 rotated.

Figure 16A:
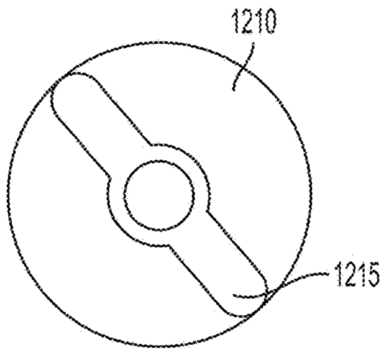
Figure 16B:
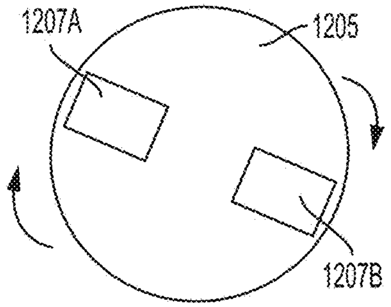

As stated above, after the hammer 1205 disengages the anvil 1210, the hammer 1205 continues to rotate (as indicated by the arrows in FIG. 16B) while the anvil 1210 remains in the same rotational position. FIGS. 16A and 16B show the rotational positions of the anvil 1210 and the hammer 1205, respectively, just as another impact is occurring. As shown in FIG. 16A, the anvil 1210 is still located in the third rotational position. As shown in FIG. 16B, the hammer 1205 has rotated 180 degrees from the third rotational position to a fourth rotational position. Relative to FIG. 14B (i.e., since the previous impact occurred), the hammer 1205 has rotated 225 degrees (i.e., 45 degrees while engaged with the anvil 1210 after the previous impact and 180 degrees after disengaging from the anvil 1210).

As mentioned previously, the controller 226 can monitor when impacts occur and can monitor the position of the shaft of the motor 214. Using this information, the controller 226 can determine the drive angle 1505 experienced by the output drive device 210 (i.e., the number of degrees that the output drive device 210 has rotated). For example, the controller 226 can detect when each impact occurs and record the rotational position of shaft. The controller 226 can then determine the number of degrees that the shaft rotated in between impacts. The controller 226 can subtract 180 degrees from the number of degrees that the shaft rotated to calculate the drive angle 1505 experienced by the output drive device 210.

The calculated drive angle 1505 can then be used to indicate a characteristic of the joint that the anchor is being driven into and to control the motor 214. For example, the smaller the drive angle 1505, the harder the joint (i.e., the anchor rotates less in harder joints than in softer joints), and vice versa. Thus, a small drive angle (i.e., less than 10 degrees) may indicate that the anchor is seated and no longer needs to be driven into the concrete. Accordingly, when the drive angle 1505 is below a predetermined angle threshold for more than a predetermined number of impacts, the controller 226 can control the motor 214 to run at a slower speed or can turn off the motor 214.

As mentioned previously and as shown in FIGS. 8A and 8B on the control screen 380 of the GUI, the concrete anchor profile includes a parameter assist block 805 for receiving, from the user, one or more of an anchor type (e.g., wedge or drop-in), an anchor length, an anchor diameter, and concrete strength (e.g., in pounds per square inch (PSI)). In response to the external device 108 receiving user inputs in the parameter assist block 805, the external device 108 adjusts parameters of the concrete anchor profile (e.g., starting speed, finishing speed, number of impacts required to reduce speed to finishing speed). The external device 108 may adjust the parameters using a look-up table that includes parameter values corresponding to the user inputs in the parameter assist block 805. If desired, the user is able to further adjust each parameter as previously explained (e.g., using a slider on the GUI as shown in FIGS. 8A and 8B). Additionally, the user can adjust the work light parameters on the control screen 380*b* as previously explained.

In some embodiments, the maximum starting speed selectable by the user on the control screen 380 of FIG. 8A (i.e., 2900 RPM) is determined based on the ability of the controller 226 to detect impacts. For example, at high speeds, the controller 226 may not be able to detect when impacts are occurring because the change in motor acceleration caused by impacts is not large enough to be recognized. Thus, the maximum starting speed selectable by the user may be set sufficiently low such that the controller 226 is still able to detect impacts even if the user selects the maximum starting speed displayed on the control screen 380.

Furthermore, in some embodiments, the finishing speed is not adjustable by the user. Rather, the finishing speed is set by the external device 108 based on the work factor inputs of the parameter assist block 805. Additionally, although not shown as an adjustable parameter on the control screen 380 of FIGS. 8A and 8B, the external device 108 may determine a drive angle threshold parameter based on the user inputs in the parameter assist block 805. When the drive angle is below the drive angle threshold, the controller 226 will begin counting impacts as explained in more detail below. The impact driver 104 receives the concrete anchor profile including the specified parameters, for instance, in response to a user save action on the external device 108 as described above.

Figure 17:
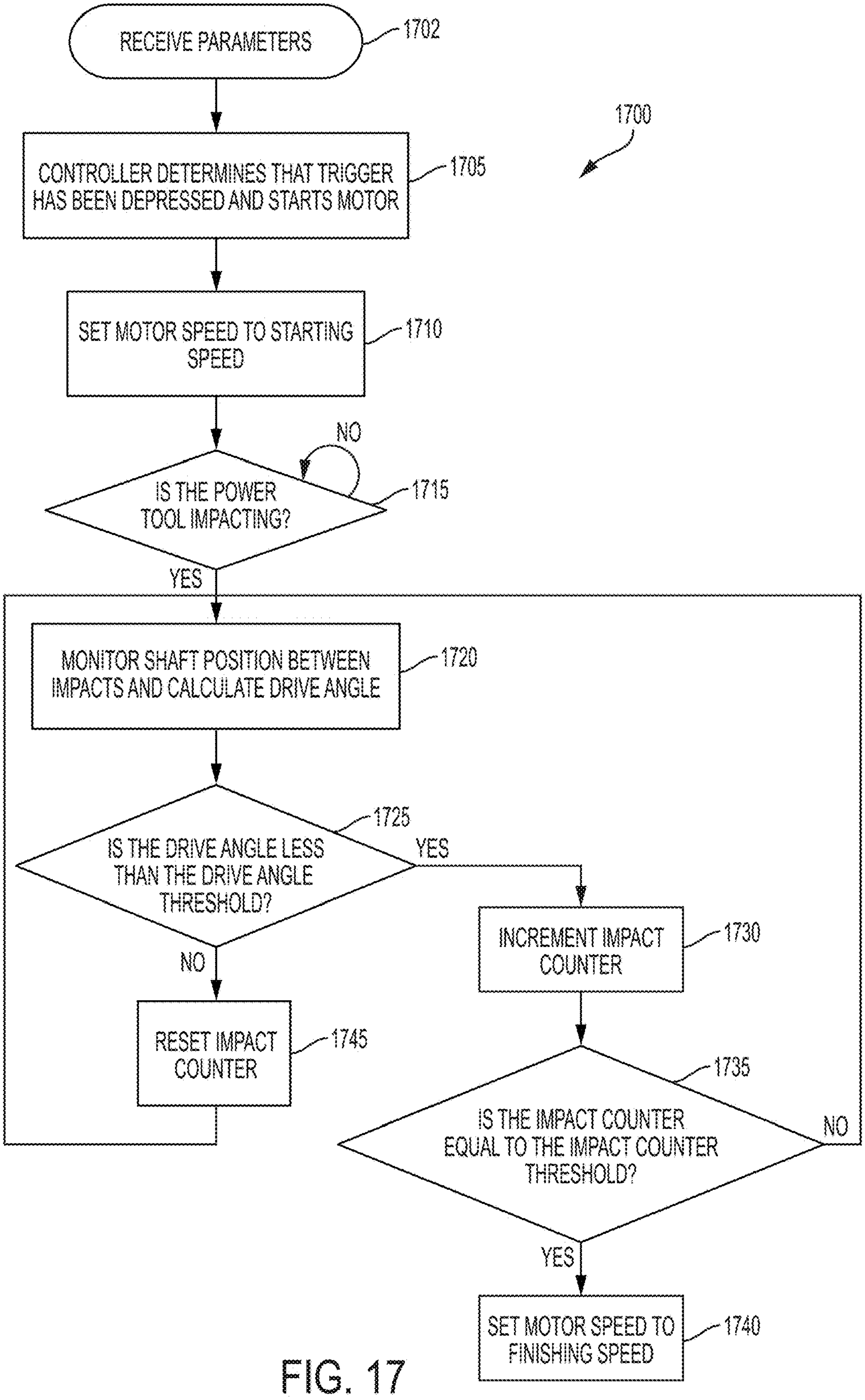
FIG. 17 illustrates a flow chart of an exemplary implementation of a concrete anchor mode of the power tool.

FIG. 17 illustrates a flowchart of a method 1700 of implementing the concrete anchor profile on the impact driver 104. At block 1702, the wireless communication controller 250 receives parameters of the concrete anchor profile from the external device 108. For example, the parameters are received as part of a concrete anchor profile configured and provided as described previously herein, for example, with respect to FIGS. 8A-B. At block 1705, the controller 226 determines that the trigger 212 has been depressed and starts the motor 214, as described previously herein. At block 1710, the controller 226 sets the motor speed to the starting speed (i.e., a first speed) (or sets the motor speed according to the amount that the trigger 212 is depressed with the maximum speed set as the starting speed as described previously herein). At block 1715, the controller 226 monitors motor characteristics to determine whether the impact driver 104 is impacting, as described previously herein. When the impact driver 104 is not impacting, the method 1700 remains at block 1715 and the controller 226 continues to monitor motor characteristics to determine whether the impact driver 104 is impacting. When the controller 226 determines that the impact driver 104 is impacting, at block 1720, the controller 226 calculates the drive angle 1505 experienced by the output drive device 210 as explained previously herein (e.g., by monitoring the rotational position of the shaft each time an impact is detected). For example, the controller 226 may calculate the drive angle 1505 by determining a first rotational position of the motor shaft upon a first impact between the hammer 1205 and the anvil 1210 (see, e.g., the rotational position of hammer 1205 in FIG. 14B), and determining a second rotational position of the motor shaft upon a second impact between the hammer 1205 and the anvil 1210 (see, e.g., the rotational position of hammer 1205 in FIG. 16B). The controller 226 may then determine the drive angle experienced by the output drive device based on the first rotational position and the second rotational position. For example, the controller 226 may determine a difference between the second rotational position and the first rotational position, and subtract a predetermined angle. The predetermined angle may be indicative of an amount of rotation experienced by the hammer 1205 from disengaging the anvil 1210 to impacting the anvil 1210. For example, with reference to the impact mechanism 1200 illustrated in FIGS. 12A and 12B and described with respect to FIGS. 13A-16B, the predetermined angle is 180 degrees. However, the amount of rotation experienced by a hammer from disengaging an anvil to impacting the anvil (and, thus, the predetermined angle) varies depending on the arrangement of the impact mechanism, such as the number of and position of the lugs on the hammer and anvil of a given impact mechanism. For example, when a hammer includes four lugs each separated by 90 degrees, rather than two lugs separated by 180 degrees, and operates with the anvil 1210, the hammer experiences 90 degrees of rotation from disengaging the anvil to impacting the anvil, rather than 180 degrees of rotation. In this example, the predetermined angle is 90 degrees.

At block 1725, the controller 226 determines whether the drive angle 1505 is less than the drive angle threshold. When the drive angle 1505 is less than the drive angle threshold, at block 1730, the controller 226 increments an impact counter (e.g., implemented by the controller 226 executing software stored on the memory 232). At block 1735, the controller 226 determines whether the impact counter is equal to the number of impacts (an "impact counter threshold") set to indicate when the motor 214 is to reduce speed. When the impact counter is not equal to the impact counter threshold, the method 1700 proceeds back to block 1720 to continue calculating the drive angle 1505 between impacts. When the impact counter is equal to the impact counter threshold, the controller 226 sets the motor speed to the finishing speed. Referring back to block 1725, when the drive angle 1505 is greater than or equal to the drive angle threshold, the method 1700 proceeds to block 1745. At block 1745, the controller 226 resets the impact counter and then proceeds back to block 1720 to continue calculating the drive angle 1505 between impacts. In alternate embodiments, the block 1745 may not be executed such that the impact counter is not reset when the controller 226 determines that the drive angle 1505 is not less than the drive angle threshold at block 1725. In such embodiments, the method 1700 remains at block 1725 until the drive angle 1505 is determined to be less than the drive angle threshold.

Although the blocks of the method 1700 are illustrated serially and in a particular order in FIG. 17, in some embodiments, one or more of the blocks are implemented in parallel, are implemented in a different order than shown, or are bypassed. In some embodiments, the impact driver 104 receives and stores the concrete anchor profile including the parameters (block 1702) at the time of manufacture of the tool. In some embodiments, the parameters received in block 1702 at the time of manufacture of the tool are received via a wired connection. Additionally, blocks 1725, 1730, 1735, 1740, and 1745 are an example of the controller 226 controlling the motor 214 based on the drive angle determined in block 1720.

While the concrete anchor mode and drive angle calculation were described with reference to fastening an anchor into concrete, the method 1700 can be implemented for other fastening applications. For example, the method 1700 can be implemented on an impact driver or wrench used to fasten a screw or other fastener into wood, drywall, or another substrate.

Some embodiments of the invention provide a method of calculating an output rotation angle of an output drive device of a motor to detect seating of a fastener and to change a driving parameter of the motor (i.e., speed) based on the calculated output rotation angle.

Some embodiments of the invention further provide a method of detecting the angular distance rotatably traveled by the shaft of a motor in between impacts on an impact driver or wrench to infer an output rotation angle of an output drive device of a motor to detect seating of a fastener and to change a driving parameter of the motor (i.e., speed) based on the calculated output rotation angle.

Some embodiments of the invention further provide a method of detecting an output rotation angle of an output drive device of a motor to change a driving parameter of the motor when a predetermined angle threshold is reached.

Thus, embodiments described herein provide, among other things, systems and methods for controlling power tools with impact mechanisms based on a drive angle from impacting. Various features and advantages of the invention are set forth in the following claims.

We claim:

1. A power tool communication system comprising:
- an external device including a first electronic processor, a first memory, a first transceiver, and a display; and
- a power tool including:
  - a housing;
  - a motor within the housing, wherein the motor includes a rotor and a stator, wherein the rotor is coupled to a motor shaft to produce a rotational output;
  - an impact mechanism including:
    - a hammer coupled to the motor shaft, and
    - an anvil configured to receive impacts from the hammer;
  - an output drive device coupled to the anvil and configured to rotate to perform a task;
  - a position sensor configured to sense positions of the rotor;
  - a second transceiver configured to communicate with the external device; and
  - an electronic controller including a second memory and a second electronic processor, the electronic controller coupled to the position sensor and to the second transceiver and configured to:
    - calculate a drive angle of the anvil caused by an impact of the impact mechanism based on the positions of the rotor sensed by the position sensor,
    - control the motor based on the drive angle, wherein, to control the motor based on the drive angle, the electronic controller is configured to
      - determine whether the drive angle is less than a drive angle threshold, and
      - alter operation of the motor in response to determining that the drive angle is less than the drive angle threshold,
    - obtain operational data of the power tool using the position sensor, another sensor, or both the position sensor and the another sensor, and
    - transmit, wirelessly via the second transceiver, the operational data to the external device, wherein the external device is configured to output visual data including the operational data on the display of the external device.

2. The power tool communication system of claim 1, wherein the electronic controller is configured to alter the operation of the motor by reducing a speed of the motor from a starting speed to a finishing speed in response to determining that the drive angle is less than the drive angle threshold.

3. The power tool communication system of claim 1, wherein the electronic controller is configured to alter the operation of the motor by turning off the motor in response to determining that the drive angle is less than the drive angle threshold.

4. The power tool communication system of claim 1, wherein, to calculate the drive angle, the electronic controller is configured to:
- determine, based on data from the position sensor, a first rotational position of the motor shaft upon a first impact between the hammer and the anvil;
- determine, based on data from the position sensor, a second rotational position of the motor shaft upon a second impact between the hammer and the anvil;
- determine a difference between the second rotational position and the first rotational position; and
- subtract a predetermined angle from the difference between the second rotational position and the first rotational position.

5. The power tool communication system of claim 1, wherein the electronic controller is configured to:
- receive, wirelessly from the external device via the second transceiver, one or more values of one or more operational parameters of the power tool; and control the motor in accordance with the one or more operational parameters.

6. The power tool communication system of claim 5, wherein the one or more values of the one or more operational parameters include a value for a maximum speed parameter of the motor, a value for a torque level parameter of the motor, or both the value for the maximum speed parameter of the motor and the value for the torque level parameter of the motor.

7. The power tool communication system of claim 6, wherein the one or more values of the one or more operational parameters include a value for the drive angle threshold.

8. The power tool communication system of claim 6, wherein the electronic controller is configured to control the motor in accordance with the maximum speed parameter in response to a trigger of the power tool being actuated regardless of an amount of actuation of the trigger.

9. The power tool communication system of claim 1, wherein the operational data of the power tool includes torque information.

10. A method of controlling a power tool, the method comprising:

communicating, with an electronic controller of the power tool, with an external device, the electronic controller including a memory and an electronic processor, and the power tool including:

a housing, a motor within the housing, wherein the motor includes a rotor and a stator, wherein the rotor is coupled to a motor shaft to produce a rotational output, an impact mechanism including:

a hammer coupled to the motor shaft, and an anvil configured to receive impacts from the hammer, an output drive device coupled to the anvil and configured to rotate to perform a task, a position sensor configured to sense positions of the rotor, and the electronic controller, wherein the electronic controller is coupled to the position sensor;

calculating, with the electronic controller, a drive angle of the anvil caused by an impact of the impact mechanism based on the positions of the rotor sensed by the position sensor, controlling, with the electronic controller, the motor based on the drive angle by:

determining whether the drive angle is less than a drive angle threshold, and altering operation of the motor in response to determining that the drive angle is less than the drive angle threshold; and obtaining operational data of the power tool using the position sensor, another sensor, or both the position sensor and the another sensor;

wherein communicating with the external device includes transmitting, with the electronic controller, the operational data to the external device for display.

11. The method of claim 10, wherein altering the operation of the motor includes reducing a speed of the motor from a starting speed to a finishing speed in response to determining that the drive angle is less than the drive angle threshold.

12. The method of claim 10, wherein altering the operation of the motor includes turning off the motor in response to determining that the drive angle is less than the drive angle threshold.

13. The method of claim 10, wherein the operational data of the power tool includes torque information.

14. The method of claim 10, wherein calculating the drive angle includes:

determining, with the electronic controller and based on data from the position sensor, a first rotational position of the motor shaft upon a first impact between the hammer and the anvil;

determining, with the electronic controller and based on data from the position sensor, a second rotational position of the motor shaft upon a second impact between the hammer and the anvil;

determining, with the electronic controller, a difference between the second rotational position and the first rotational position, and subtracting, with the electronic controller, a predetermined angle from the difference between the second rotational position and the first rotational position.

15. The method of claim 10, wherein communicating with external device includes wirelessly communicating, with the electronic controller via a transceiver of the power tool, with the external device.

16. A power tool comprising:

a housing;

a motor within the housing, wherein the motor includes a rotor and a stator, wherein the rotor is coupled to a motor shaft to produce a rotational output;

an impact mechanism including:

a hammer coupled to the motor shaft, and an anvil configured to receive impacts from the hammer;

an output drive device coupled to the anvil and configured to rotate to perform a task;

a position sensor configured to sense a position of the rotor;

a transceiver configured to communicate with an external device; and an electronic controller including a memory and an electronic processor, the electronic controller coupled to the position sensor and to the transceiver and configured to:

calculate a drive angle of the anvil caused by an impact of the impact mechanism based on the position of the rotor sensed by the position sensor, control the motor based on the drive angle, wherein, to control the motor based on the drive angle, the electronic controller is configured to:

determine whether the drive angle is less than a drive angle threshold, and alter operation of the motor in response to determining that the drive angle is less than the drive angle threshold, obtain operational data of the power tool using the position sensor, another sensor, or both the position sensor and the another sensor, and transmit, wirelessly via the transceiver, the operational data to the external device for display.

17. The power tool of claim 16, wherein the electronic controller is configured to alter the operation of the motor by reducing a speed of the motor from a starting speed to a finishing speed in response to determining that the drive angle is less than the drive angle threshold.

18. The power tool of claim 16, wherein the electronic controller is configured to alter the operation of the motor by turning off the motor in response to determining that the drive angle is less than the drive angle threshold.

19. The power tool of claim 16, wherein, to calculate the drive angle, the electronic controller is configured to:

determine, based on data from the position sensor, a first rotational position of the motor shaft upon a first impact between the hammer and the anvil;

determine, based on data from the position sensor, a second rotational position of the motor shaft upon a second impact between the hammer and the anvil;

determine a difference between the second rotational position and the first rotational position; and subtract a predetermined angle from the difference between the second rotational position and the first rotational position.

20. The power tool of claim 16, wherein the operational data of the power tool includes torque information.

* * * * *